US010261317B2

(12) United States Patent
Furuya et al.

(10) Patent No.: US 10,261,317 B2
(45) Date of Patent: Apr. 16, 2019

(54) IMAGE DISPLAY DEVICE

(71) Applicant: Panasonic Intellectual Property Management Co., Ltd., Osaka (JP)

(72) Inventors: Hiroyuki Furuya, Osaka (JP); Akira Kurozuka, Osaka (JP); Yuta Yamamoto, Kyoto (JP); Susumu Uragami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/991,708

(22) Filed: May 29, 2018

(65) Prior Publication Data
US 2018/0356632 A1 Dec. 13, 2018

(30) Foreign Application Priority Data

Jun. 12, 2017 (JP) .................................. 2017-115114

(51) Int. Cl.
G02B 27/01 (2006.01)
G03B 21/14 (2006.01)
G02B 26/10 (2006.01)
G03B 21/00 (2006.01)

(52) U.S. Cl.
CPC ......... *G02B 27/0101* (2013.01); *G02B 26/10* (2013.01); *G02B 27/0149* (2013.01); *G03B 21/00* (2013.01); *G02B 2027/011* (2013.01); *G02B 2027/0127* (2013.01); *G02B 2027/0154* (2013.01); *G02B 2027/0161* (2013.01)

(58) Field of Classification Search
CPC combination set(s) only.
See application file for complete search history.

(56) References Cited

U.S. PATENT DOCUMENTS

| | | | |
|---|---|---|---|
| 2002/0167189 A1* | 11/2002 | Nakamura | G02B 27/0149 296/70 |
| 2009/0160736 A1 | 6/2009 | Shikita | |
| 2017/0212347 A1* | 7/2017 | Uragami | G02B 27/0149 |
| 2017/0264872 A1* | 9/2017 | Uragami | G02B 27/0101 |
| 2018/0095266 A1* | 4/2018 | Takahashi | G02B 26/101 |
| 2018/0239140 A1* | 8/2018 | Uragami | G02B 27/0149 |
| 2018/0364480 A1* | 12/2018 | Furuya | G02B 27/0149 |
| 2018/0374407 A1* | 12/2018 | Furuya | G09G 3/025 |
| 2019/0018239 A1* | 1/2019 | Kurozuka | B60K 35/00 |
| 2019/0018240 A1* | 1/2019 | Kasazumi | G02B 27/0101 |
| 2019/0018250 A1* | 1/2019 | Kasazumi | G02B 27/0179 |

FOREIGN PATENT DOCUMENTS

JP 2009-150947 7/2009

* cited by examiner

*Primary Examiner* — William C. Dowling
(74) *Attorney, Agent, or Firm* — McDermott Will & Emery LLP

(57) ABSTRACT

The image display device includes a light source, screens on which images are formed by being irradiated with light from the light source, a scanning unit that scans the screens by using the light from the light source, an optical system that generates a virtual image by using light from the screens, and a drive unit that includes a holder for integrally supporting the screens and moves the screens together with the holder The screens are aligned in a direction perpendicular to a movement direction of the holder caused by the drive unit, and are installed at positions that are shifted from each other by a certain distance in the movement direction.

8 Claims, 19 Drawing Sheets

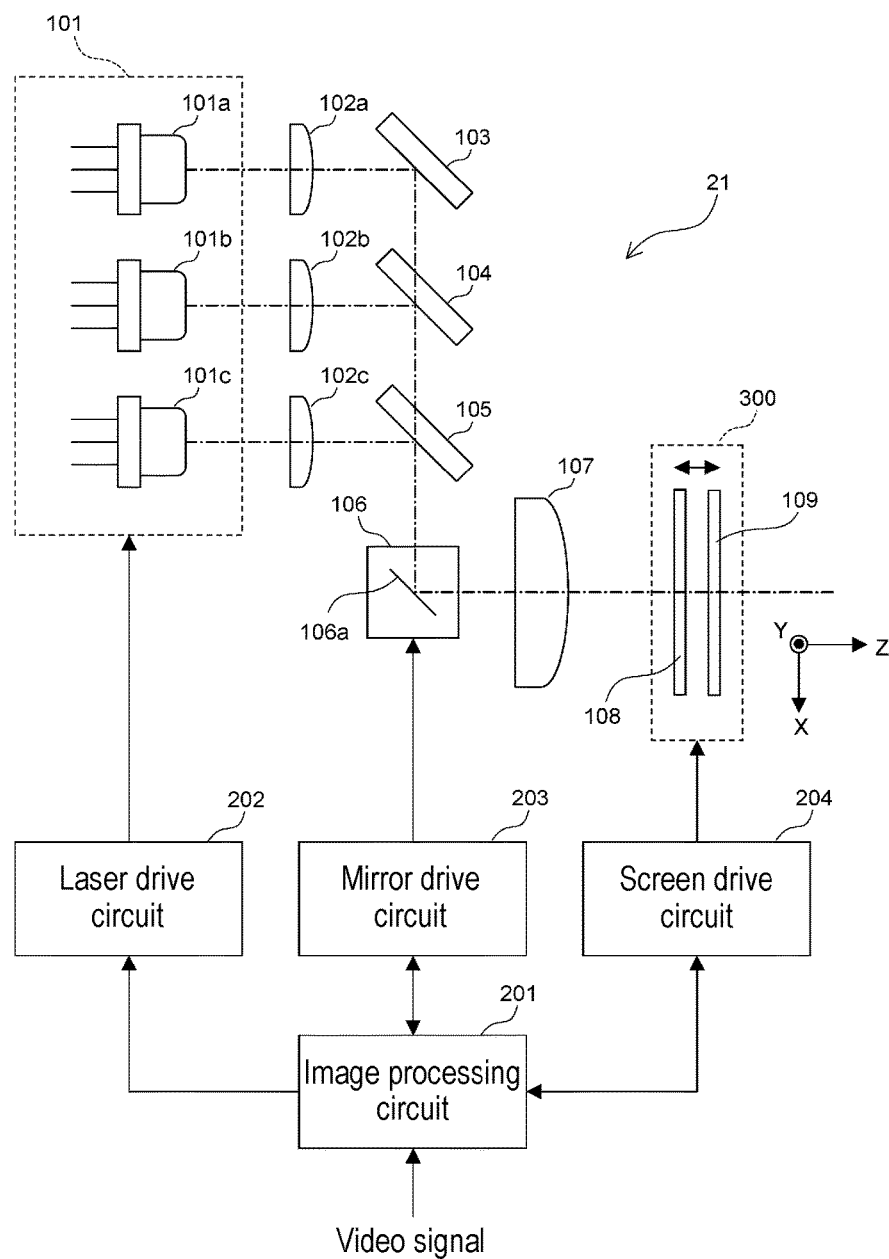

Laser beam

IMAGE DISPLAY DEVICE

BACKGROUND

1. Technical Field

The present disclosure relates to an image display device. For example, the present disclosure relates to an image display device suitable for being mounted on a moving body such as a passenger vehicle.

2. Description of the Related Art

In recent years, an image display device called a head-up display has been developed, and the head-up display concerned has been mounted on a moving body such as a passenger vehicle. In the head-up display mounted on the passenger vehicle, light modulated by image information is projected toward a windshield (windscreen), and the light reflected by the windshield is applied to driver's eyes. In this way, the driver can view a virtual image of an image in front of the windshield. For example, a vehicle speed or an outside air temperature is displayed as the virtual image. Recently, it is also considered to display, as a virtual image, a navigation image and an image for calling the attention on passengers to the driver.

In the above head-up display, a laser light source such as a semiconductor laser can be used as a light source to generate a virtual image. In this configuration, laser light scans a screen while being modulated depending on a video signal. The screen diffuses the laser light to broaden a region in which the light is radiated to the driver's eyes. This arrangement prevents the driver's eyes from getting out of the irradiated region even if the driver moves his or her head to some extent, and the driver thus can view the image (virtual image) satisfactorily and stably.

PTL 1 below discloses a configuration in which a screen is moved in an optical axis direction to vary an image-forming position of a virtual image in a front-back direction. In this configuration, the screen is driven by using a motor, a feed screw, and a rack.

CITATION LIST

Patent Literature

PTL 1: Unexamined Japanese Patent Publication No. 2009-150947

SUMMARY

A series of images are drawn on a screen while varying a position of the screen in an optical axis direction at a high speed. This enables display of an image whose sight distance varies in a depth direction (hereafter, referred to as a "depth image"). With this configuration, a depth image such as an arrow indicating a traveling direction of a vehicle can be displayed while being superimposed on a road on an intersection, for example.

Furthermore, an image is drawn while fixing the position of the screen. This enables display of an image whose sight distance is constant (hereafter, referred to as a "fixed image") at a position with a predetermined sight distance as a virtual image. With this configuration, information such as a vehicle speed or an outside air temperature can be displayed. In this case, a sight distance of the fixed image is set remarkably shorter than a sight distance of depth image. For example, the sight distance of the depth image is set to about 10 m to about 100 m, and the sight distance of the fixed image is set to about 3 m. When a range of the sight distance of the fixed image largely differs from a range of the sight distance of the depth image in such a manner, if one screen is caused to display both the depth image and the fixed image, a movement range of the screen is remarkably extended. This makes it difficult to stably move the screen at a high speed.

To solve such a problem, a configuration in which a screen for the depth image and a screen for the fixed image are independently disposed can be used. This configuration can reduce a movement range of the screen for the depth image, and can stably move the screen at a high speed.

However, in the configuration in which the screen for the depth image is independently driven, the screen for the depth image is moved relative to the screen for the fixed image. Therefore, a gap needs to be disposed between a holder for supporting the screen for the depth image and an installation mechanism of the screen for the fixed image. Hence, when both the screens are viewed from a light irradiating side, a gap is generated between both the screens. A virtual image of a source of light scanning the screens is visually recognized by a driver through this gap, which is a problem.

In terms of such a problem, an object of the present disclosure is to provide an image display device capable of independently displaying images on a plurality of screens, while preventing a virtual image of a source of light scanning the screens from being visually recognized by a driver.

An image display device according to a primary aspect of the present disclosure includes a light source, a first screen, a second screen, a scanning unit, an optical system, a holder, and a drive unit. The first screen is irradiated with light from the light source to form an image on the first screen. The second screen is irradiated with the light from the light source to form an image on the second screen. The scanning unit scans the first screen and the second screen using the light from the light source. The optical system forms a virtual image by using light from the first screen and the second screen. The holder integrally supports the optical system and the first and second screens. The drive unit moves the first and second screens together with the holder. Herein, the first screen and the second screen are aligned perpendicular to a movement direction of the holder caused by the drive unit, and are installed at positions that are shifted from each other by a certain distance in the movement direction.

According to the image display device of this aspect, the first screen and the second screen are integrally supported by the holder and are simultaneously driven. Therefore, a gap as in a case where only the first screen is independently driven does not need to be disposed. Hence, when both the screens are viewed from a light irradiating side, a gap between both the screens can be prevented from being generated. This can prevent a virtual image of a light emitting source of light scanning the screens from being visually recognized by the driver, through this gap. As described above, the image display device according to this aspect can independently display the images on the plurality of screens, while preventing the virtual image of the light emitting source of light scanning the screens from being visually recognized by the driver.

An image display device according to another aspect of the present disclosure includes a light source, a screen, an optical system, a holder, a drive unit, and a light shield member. The screen is irradiated with light from the light source to form an image on the screen. The optical system forms a virtual image by using the light from the screen. The holder supports the screen. The drive unit moves the screen together with the holder. The light shield member covers a periphery of the screen. Herein the holder has a protuberance that supports a peripheral edge of the screen. The light shield member is installed on the holder such that an inner peripheral edge of the light shield overlaps an upper surface of the peripheral edge of the screen supported by the protuberance through a heat resistant member.

According to the image display device of this aspect, stray light that such as natural light goes backward through the optical system and approaches a portion of the holder around the screen is blocked by the light shield member. Therefore this portion of the holder is prevented from becoming high in temperature by the stray light. Accordingly the screen can be prevented from receiving damage by heat from the holder, the heat being generated by the stray light. Further, the heat resistant member is interposed between the light shield member and an upper surface of the screen. Therefore, even when the light shield member becomes high in temperature by the stray light, heat propagation from the light shield member to the screen can be prevented. Accordingly, the screen can be prevented from being damaged by the heat from the light shield member. Furthermore the screen is installed on the holder such that the peripheral edge of the screen is supported by a protuberance. Therefore even when the stray light enters a position of the holder right below the peripheral edge of the screen from around an inner peripheral edge of the light shield member and this position right below the peripheral edge of the screen becomes high in temperature, heat at this position right below the peripheral edge of the screen does not directly propagate to the screen. Hence the screen can be prevented from being damaged by heat from this position right below the peripheral edge of the screen. In this way, according to the image display device of this aspect, the screen can be prevented from being damaged by heat owing to the stray light that goes backward through the optical system and approaches the holder.

As described above, the present disclosure can provide an image display device capable of independently displaying images on a plurality of screens, while preventing a virtual image of a light emitting source of light scanning the screens from being visually recognized by a driver.

Effects or meanings of the present disclosure will be further clarified in the following description of the exemplary embodiment. However, the exemplary embodiment described below is merely an example of implementing the present disclosure, and the present disclosure is not at all limited to the example described in the following exemplary embodiment.

BRIEF DESCRIPTION OF THE DRAWINGS

FIG. 2 is a view illustrating an irradiation light generator of the image display device according to the exemplary embodiment and a configuration of a circuit used for the irradiation light generator;

DETAILED DESCRIPTION

Figure 1A:
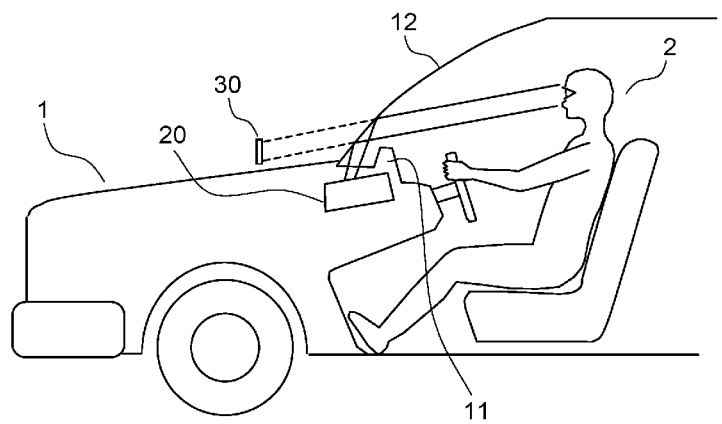
FIG. 1A is a view schematically illustrating a usage form of an image display device according to an exemplary embodiment.

Hereinafter, an exemplary embodiment of the present disclosure will be described with reference to the accompanying drawings. X, Y, and Z-axes perpendicular to one another are added to respective drawings. In this exemplary embodiment, the present disclosure is applied to an on-vehicle head-up display.

Note that, in the exemplary embodiment described below, screen 108 corresponds to a "first screen" described in the claims, and screen 109 corresponds to a "second screen" described in the claims. Light shield member 364 corresponds to a "first light shield member" described in the claims, and light shield member 365 corresponds to a "second light shield member" described in the claims. Further, protuberance 361e corresponds to a "first protuberance" described in the claims, and protuberance 361i corresponds to a "second protuberance" described in the claims. However, those correspondence relationships do not limit at all significances of respective terms described in the claims.

Figure 1B:
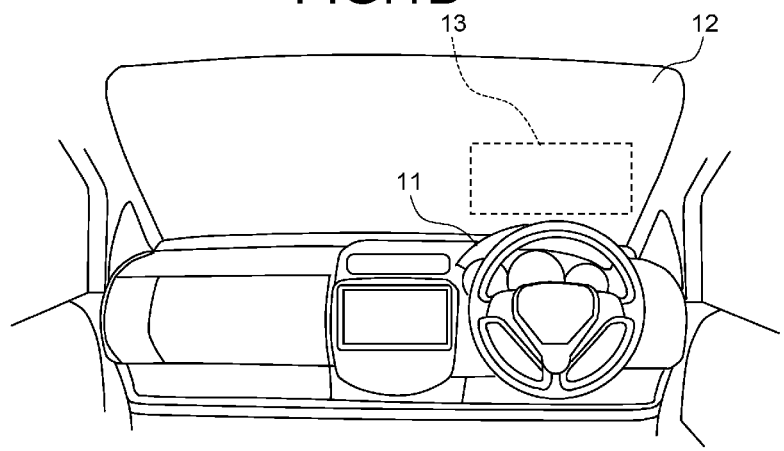
FIG. 1B is a view schematically illustrating the usage form of the image display device according to the exemplary embodiment.

FIGS. 1A and 1B are views schematically illustrating a usage form of image display device 20. FIG. 1A is a view schematically illustrating, in a see-through manner, an inside of passenger vehicle 1 as seen from the side of passenger vehicle 1, and FIG. 1B is a view of a front of passenger vehicle 1 in a driving direction as seen from the inside of passenger vehicle 1.

As illustrated in FIG. 1A, image display device 20 is installed inside dashboard 11 of passenger vehicle 1.

As illustrated in FIG. 1A and FIG. 1B, image display device 20 projects laser light, which is modulated by a video signal, onto projection region 13 near a driver's seat on a lower side of windshield 12. The laser light is reflected by projection region 13, and is applied to an oblong region (eyebox region) around a position of driver 2's eyes. In this way, predetermined image 30 is displayed as a virtual image in a viewing field in front of driver 2.

Therefore, driver 2 can view image 30, which is the virtual image, superimposed on a scene in front of windshield 12. In other words, image display device 20 forms image 30, which is the virtual image, in a space in front of projection region 13 of windshield 12.

Figure 1C:
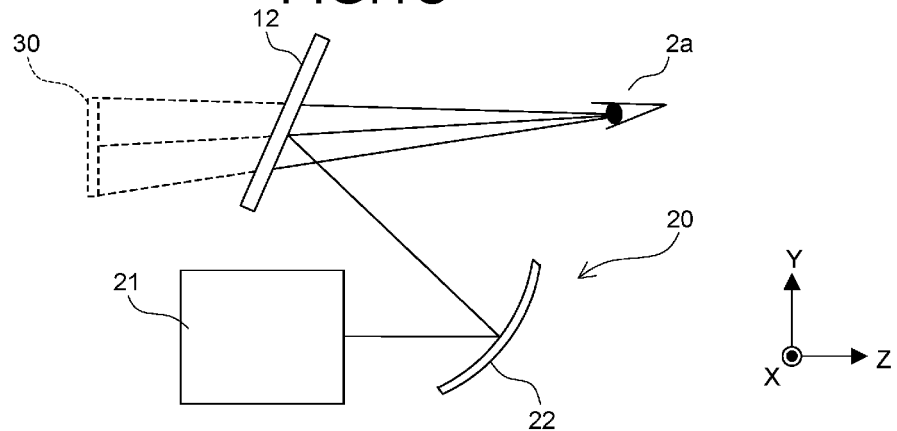
FIG. 1C is a view schematically illustrating a configuration of the image display device according to the exemplary embodiment.

FIG. 1C is a view schematically illustrating a configuration of image display device 20.

Image display device 20 includes irradiation light generator 21 and mirror 22. Irradiation light generator 21 emits light modulated by the video signal. Mirror 22 has a curved reflecting surface, and reflects the light, which is emitted from irradiation light generator 21, toward windshield 12. The light reflected by windshield 12 is applied to eye 2a of driver 2. An optical system of irradiation light generator 21 and mirror 22 are designed such that image 30 as the virtual image can be displayed in a predetermined size in front of windshield 12.

Mirror 22 constitutes an optical system for generating the virtual image by using light from screens 108, 109 to be described later. This optical system does not necessarily have to be constituted only with mirror 22. For example, this optical system may include a plurality of mirrors, and may include a lens or other components.

FIG. 2 is a diagram illustrating a configuration of irradiation light generator 21 in image display device 20 and a circuit configuration used for irradiation light generator 21.

Irradiation light generator 21 includes light source 101, collimator lenses 102a to 102c, mirror 103, dichroic mirrors 104, 105, scanning unit 106, correction lens 107, screens 108, 109, and drive unit 300.

Light source 101 includes three laser light sources 101a to 101c. Laser light sources 101a to 101c respectively emit a laser beam in a red wavelength band, a laser beam in a green wavelength band, and a laser beam in a blue wavelength band. In this exemplary embodiment, in order to display a color image as image 30, light source 101 includes three laser light sources 101a to 101c. In cases where a monochrome image is displayed as image 30, light source 101 may include only one laser light source corresponding to a color of the image. Laser light sources 101a to 101c are configured with semiconductor lasers, for example.

Laser beams emitted from laser light sources 101a to 101c are respectively converted into parallel light by collimator lenses 102a to 102c. At this time, the laser beam emitted from each of laser light sources 101a to 101c is shaped into a circular beam shape by an aperture (not illustrated). Note that, in place of collimator lenses 102a to 102c, shaping lenses may be used, each of which shapes the laser beam into a circular beam shape and collimates the laser beam. In such a case, the aperture can be omitted.

Then, with respect to the laser beams of the respective colors emitted from laser light sources 101a to 101c, optical axes of the laser beams are aligned with one another by mirror 103 and two dichroic mirrors 104, 105. Mirror 103 totally reflects the red laser beam transmitted through collimator lens 102a. Dichroic mirror 104 reflects the green laser beam transmitted through collimator lens 102b, and transmits the red laser beam reflected by mirror 103. Dichroic mirror 105 reflects the blue laser beam transmitted through collimator lens 102c, and transmits the red laser beam and the green laser beam, which have passed through dichroic mirror 104. Mirror 103 and two dichroic mirrors 104, 105 are disposed so as to align the optical axes of the laser beams of the respective colors with one another, the laser beams being emitted from laser light sources 101a to 101c.

Scanning unit 106 reflects the laser beams of the respective colors that have passed through dichroic mirror 105. Scanning unit 106 is made of, for example, a micro electro mechanical system (MEMS) mirror. The scanning unit 106 includes a configuration to rotate mirror 106a, onto which the laser beams of the respective colors having passed through dichroic mirror 105 is made incident, around an axis parallel to the Y-axis and an axis perpendicular to the Y-axis in response to a drive signal. Mirror 106a is rotated as described above, whereby a reflecting direction of the laser beam changes in an in-plane direction of an X-Z plane and in an in-plane direction of a Y-Z plane. In this way, as will be described later, screens 108, 109 are scanned by the laser beams of the respective colors.

Note that, although scanning unit 106 is configured with the MEMS mirror of such a two-axis driving system here, scanning unit 106 may have another configuration. For example, scanning unit 106 may be configured with a combination of a mirror rotationally driven around the axis parallel to the Y-axis and a mirror rotationally driven around the axis perpendicular to the Y-axis.

Correction lens 107 is designed to direct the laser beams of the respective colors in a positive direction of the Z-axis regardless of a swing angle of the laser beams deflected by scanning unit 106. Screens 108, 109 are scanned by the laser beams to form images, and screens 108, 109 diffuse the incident laser beams to a region (eyebox region) around a position of eye 2a of driver 2. Each of screens 108, 109 is made of a transparent resin such as polyethylene terephthalate (PET).

Screen 108 is used to display a depth image whose sight distance changes in a depth direction, and screen 109 is used to display a fixed image whose sight distance is constant. For example, an arrow for guiding a driving direction of a vehicle is displayed as the depth image, and characters indicating a vehicle speed or an outside air temperature are displayed as the fixed image.

Drive unit 300 reciprocates screens 108, 109 in a direction (Z-axis direction) parallel to a traveling direction of the laser beam. A configuration of drive unit 300 will be described later with reference to FIG. 4A to FIG. 14B.

Image processing circuit 201 includes an arithmetic processing unit such as a central processing unit (CPU) and a memory, processes a video signal, which is input thereto, and controls laser drive circuit 202, mirror drive circuit 203, and screen drive circuit 204. Laser drive circuit 202 varies emission intensity of laser light sources 101a to 101c in response to a control signal from image processing circuit 201. Mirror drive circuit 203 drives mirror 106a of scanning unit 106 in response to a control signal from image processing circuit 201. Screen drive circuit 204 drives screens 108, 109 in response to a control signal from image processing circuit 201. Control in image processing circuit 201 at the time of an image display operation will be described later with reference to FIG. 16A.

Figure 3A:
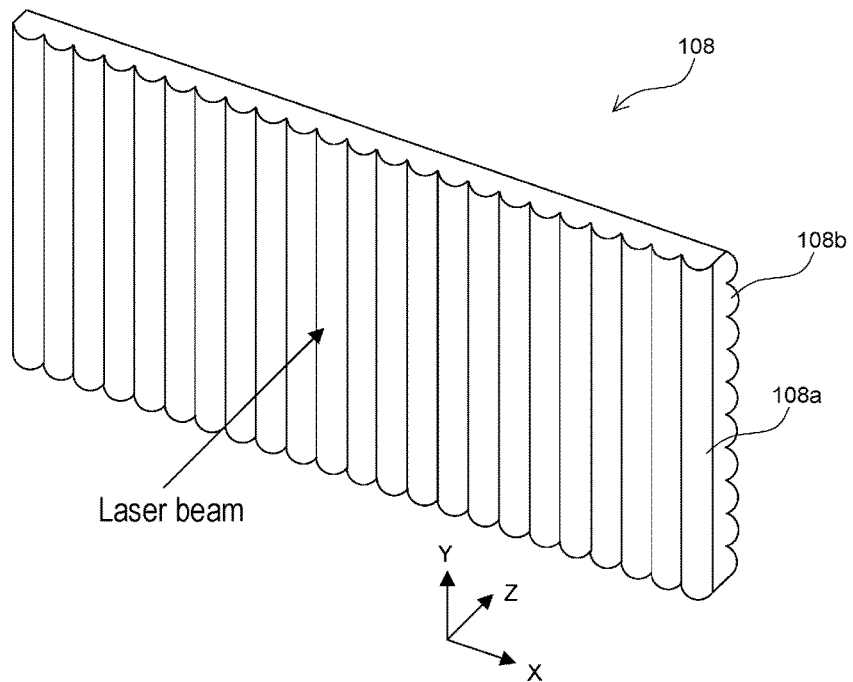
FIG. 3A is a perspective view schematically illustrating a configuration of a screen according to the exemplary embodiment.
Figure 3B:
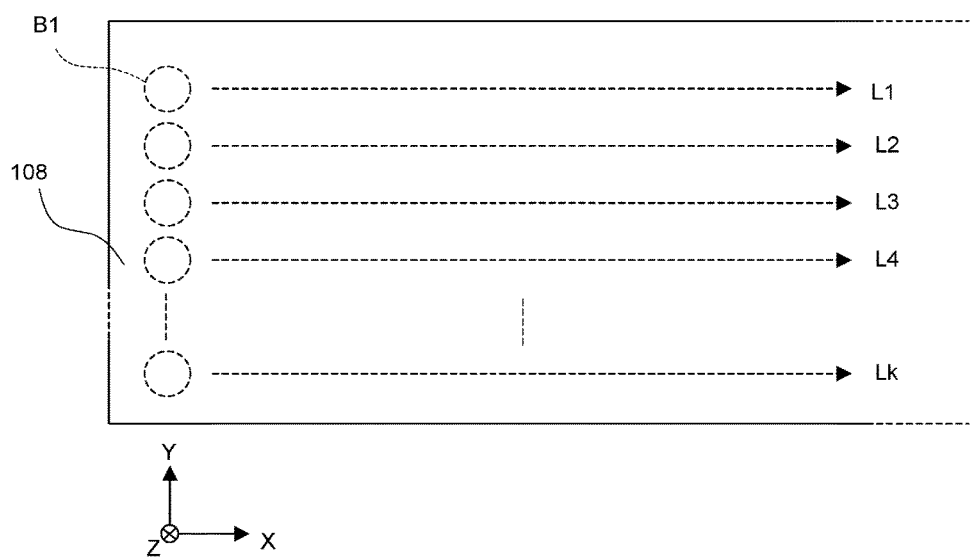
FIG. 3B is a view schematically illustrating a scanning method of a laser beam with respect to the screen according to the exemplary embodiment.

FIG. 3A is a perspective view schematically illustrating a configuration of screen 108. FIG. 3B is a view schematically illustrating a scanning method of the laser beam with respect to screen 108.

As illustrated in FIG. 3A, a plurality of first lens units 108a for diverging the laser beam in the X-axis direction are formed on a surface on a laser beam incident side of screen 108 (that is, a surface on a negative side of the Z-axis) so as to be arrayed in the X-axis direction. A shape of first lens units 108a as viewed in the Y-axis direction is a substantially circular arc shape. A width in the X-axis direction of each of first lens units 108a is, for example, 50 μm.

Further, a plurality of second lens units 108b for diverging the laser beam in the Y-axis direction are formed on a surface on a laser beam emission side of screen 108 (that is, a surface on a positive side of the Z-axis) so as to be arrayed in the Y-axis direction. A shape of second lens units 108b as viewed in the X-axis direction is a substantially circular arc shape. A width in the Y-axis direction of each of second lens units 108b is, for example, 70 μm.

An incident surface (a surface on the negative side of the Z-axis) of screen 108 having the above-described configuration is scanned, as illustrated in FIG. 3B, in the positive direction of the X-axis by beam B1 in which the laser beams of the respective colors are superimposed on one another. On the incident surface of screen 108, scanning lines L1 to Lk through which beam B1 passes are set beforehand at constant intervals in the Y-axis direction. Start positions of scanning lines L1 to Lk coincide with one another in the X-axis direction, and end positions of scanning lines L1 to Lk coincide with one another in the X-axis direction. A diameter of beam B1 is set to approximately 50 μm, for example.

Scanning lines L1 to Lk are scanned by high frequency beam B1 in which the laser beams of the respective colors are modulated by the video signal, thereby forming an image. The image thus constituted is projected onto the region (eyebox) around the position of eye 2a of driver 2 via screen 108, mirror 22, and windshield 12 (refer to FIG. 1C). In this way, driver 2 visually recognizes image 30 as the virtual image in a space in front of windshield 12.

Screen 109 also has a configuration similar to that of screen 108. In the Y-axis direction, a width of screen 109 is set smaller than a width of screen 108. Screen 109 is also scanned by beam B1 in the X-axis direction, similar to screen 108. A number of scanning lines for screen 109 is smaller than a number of scanning lines for screen 108.

In this exemplary embodiment, screens 108, 109 are integrally supported, and are driven by drive unit 300. When the depth image is displayed, screen 108 is scanned by beam B1 while being moved in an optical axis direction (Z-axis direction) together with screen 109. When the fixed image is displayed, screen 109 is stopped at a predetermined position together with screen 108, and is scanned by beam B1.

Next, a configuration of drive unit 300 will be described.

Figure 4A:
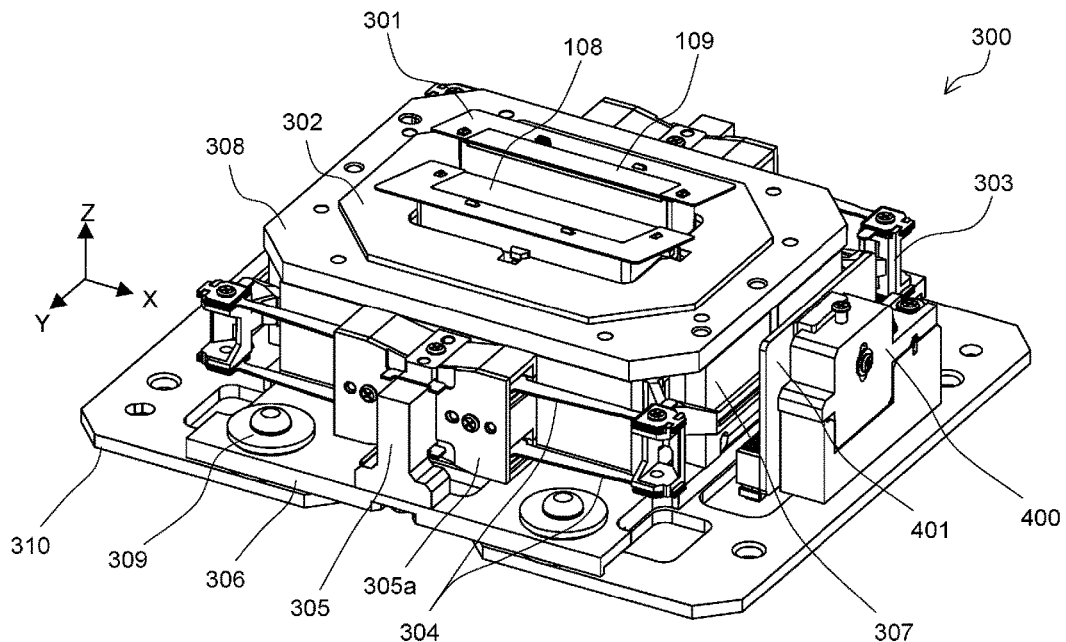
FIG. 4A is a perspective view schematically illustrating a configuration of a drive unit according to the exemplary embodiment.
Figure 4B:
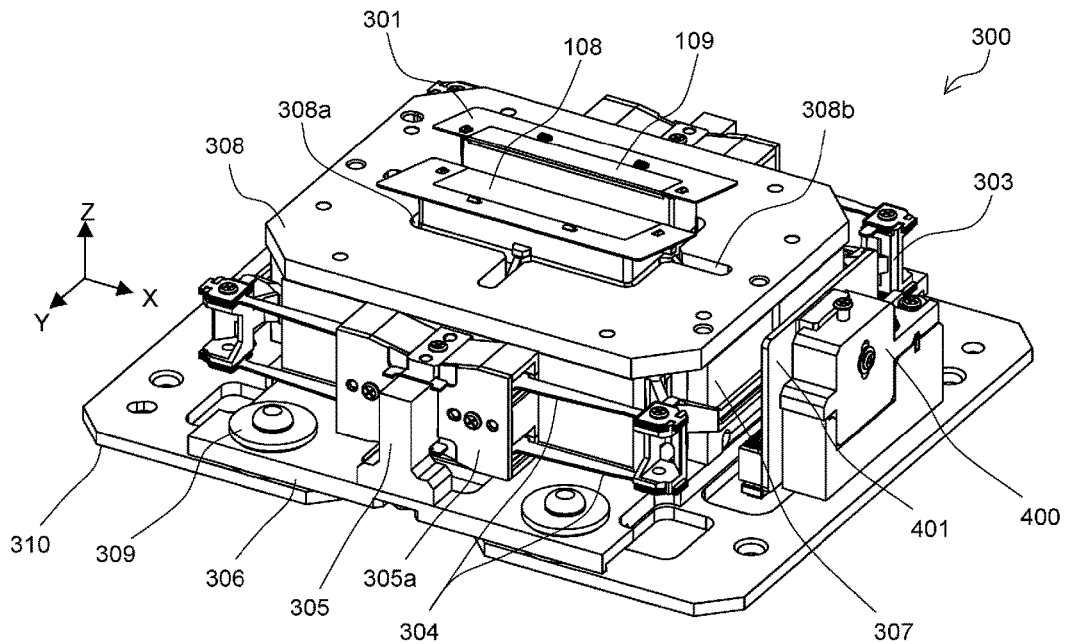
FIG. 4B is a perspective view illustrating the configuration of the drive unit according to the exemplary embodiment when light shield covers are detached.
Figure 5A:
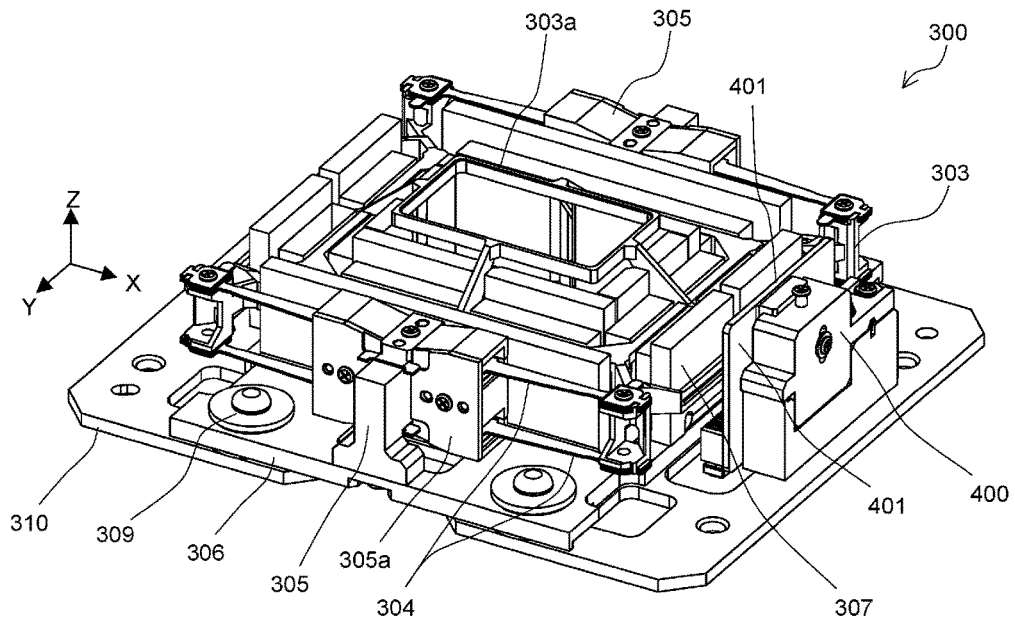
FIG. 5A is a perspective view illustrating the configuration of the drive unit according to the exemplary embodiment when a light shield cover, a magnetic cover, and a structure body are removed.

FIG. 4A is a perspective view illustrating the configuration of drive unit 300, and FIG. 4B is a perspective view illustrating the configuration of drive unit 300 when light shield cover 302 is detached. FIG. 5A is a perspective view illustrating the configuration of drive unit 300 when light shield cover 302, magnetic cover 308, and structure body 301 are detached. FIGS. 4A, 4B, and 5A illustrate drive unit 300 supported by support base 306 and fixed base 310.

Note that in the following, the configuration will be described, defining directions by X, Y, and Z-axes, and in addition, assuming that a side closer to a center of drive unit 300 and a side farther from the center of drive unit 300 in a plan view are respectively referred to as an inside and an outside, for the sake of convenience.

As illustrated in FIGS. 4A and 4B, screens 108, 109 are integrally supported by structure body 301 so as to incline in the same direction with each other. Two screens 108, 109 are aligned in a direction (Y-axis direction) perpendicular to a movement direction (Z-axis direction) caused by drive unit 300, and are installed at positions that are mutually shifted by a predetermined distance in the movement direction (Z-axis direction). Light shield cover 302 is installed so as to cover a periphery of structure body 301. Light shield cover 302 is installed on an upper surface of magnetic cover 308 to cover slits 308b of magnetic cover 308 illustrated in FIG. 4B.

Structure body 301 installed with screens 108, 109 is installed to inner frame 303a of support member 303 illustrated in FIG. 5A. Support member 303 is supported, movably in the Z-axis direction, by two support units 305 aligned in the Y-axis direction via four suspensions 304. Support units 305 are installed to support base 306. Each support unit 305 includes gel covers 305a on a positive side and a negative side of the X-axis, respectively, and gels are filled in those gel covers 305a for dumping.

In this way, screens 108, 109 are supported, movably in the Z-axis direction, by support base 306 via structure body 301, support member 303, suspensions 304, and support units 305. Configurations of support member 303 and suspensions 304 will be described later with reference to FIGS. 8A to 8C. Further, a configuration of support base 306 will be described later with reference to FIG. 5B.

Magnetic circuit 307 is further installed on support base 306. Magnetic circuit 307 is used to apply a magnetic field to coil 341 (refer to FIG. 8A) mounted on support member 303. When a drive signal (current) is applied to coil 341, electromagnetic force in the Z-axis direction is excited in coil 341. With this configuration, support member 303 and coil 341 are driven in the Z-axis direction. Thus, screens 108, 109 move in the Z-axis direction. A configuration of magnetic circuit 307 will be described later with reference to FIGS. 6A and 6B.

Magnetic cover 308 is put on an upper surface of magnetic circuit 307. Magnetic cover 308 is made of a magnetic material and functions as a yoke of magnetic circuit 307. When magnetic cover 308 is put on the upper surface of magnetic circuit 307, magnetic cover 308 is attracted to magnetic circuit 307. Magnetic cover 308 is thus installed on drive unit 300. As illustrated in FIG. 4B, magnetic cover 308 is provided with opening 308a to let structure body 301 pass through, and slits 308b to let corresponding beams 303c (refer to FIG. 8A) of support member 303 pass through.

Support base 306 is installed on fixed base 310 through damper units 309. Damper units 309 support the support base 306 while keeping support base 306 in suspension in the positive direction of the Z-axis with respect to fixed base 310. Damper units 309 absorb the vibration generated in association with the driving of support member 303 before the vibration is transmitted from support base 306 to fixed base 310. Configurations of damper units 309 and fixed base 310 will be described later with reference to FIG. 7.

On fixed base 310, position detection unit 400 is further installed. Position detection unit 400 includes printed board 401 facing a side surface of support member 303 on the positive side of the X-axis. An encoder (not illustrated) is disposed on a surface of printed board 401 on the negative side of the X-axis. This encoder detects a position of support member 303 in the Z-axis direction. A method for detecting the position of support member 303 with the encoder will be described later with reference to FIG. 8A.

Figure 5B:
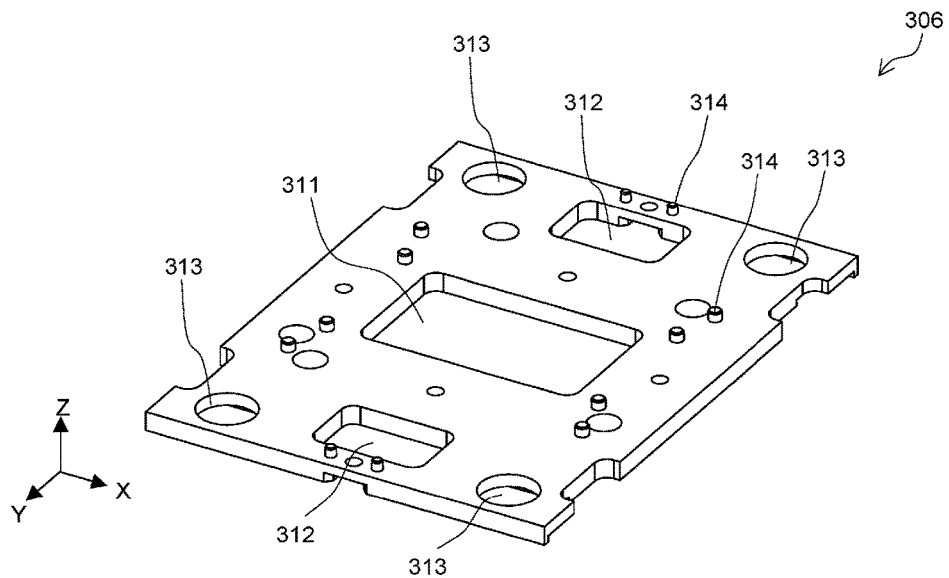
FIG. 5B is a perspective view illustrating a configuration of a support base according to the exemplary embodiment.

FIG. 5B is a perspective view illustrating a configuration of support base 306 when viewed from the positive side of the Z-axis.

As illustrated in FIG. 5B, support base 306 has an rectangular shape in a plan view. Support base 306 is made of a highly rigid metal material. Opening 311 is formed at a center of support base 306 to let laser light pass through. In addition, on each of four corners of support base 306, circular hole 313 for installing each of damper units 309 is formed.

Further, at a central position in the X-axis direction in each of an end part on a positive side of the Y-axis and an end part on a negative side of the Y-axis of support base 306, opening 312 for receiving support unit 305 is formed. In addition, on an upper surface (a surface on the positive side of the Z-axis) of support base 306, a plurality of bosses 314 for positioning magnetic circuit 307 and support units 305 is formed.

Figure 6A:
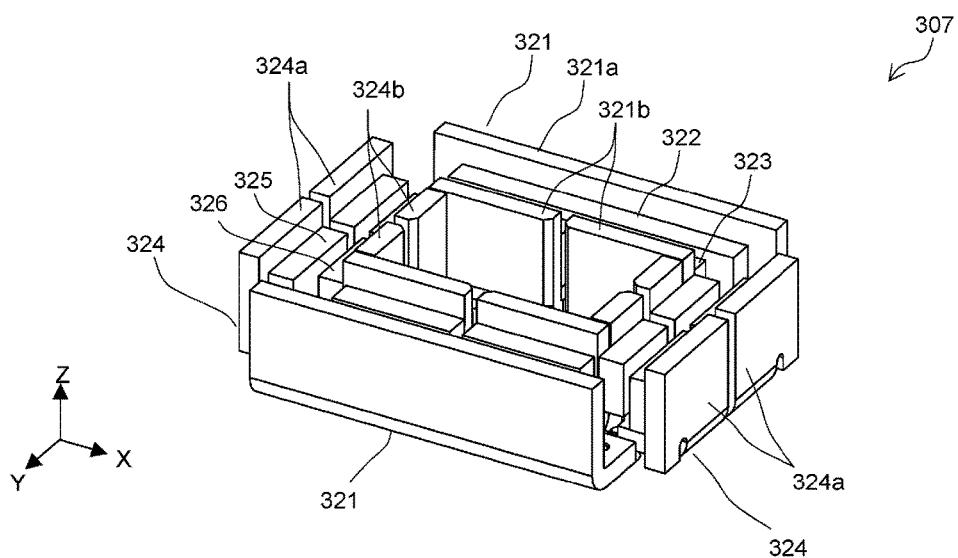
FIG. 6A is a perspective view illustrating a configuration of a magnetic circuit according to the exemplary embodiment.
Figure 6B:
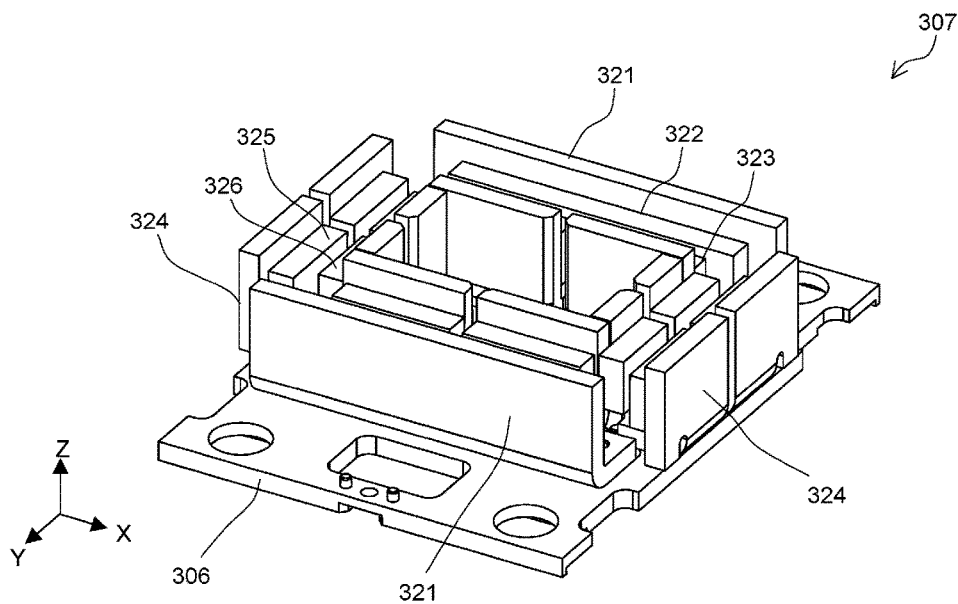
FIG. 6B is a perspective view illustrating the configuration of the magnetic circuit according to the exemplary embodiment.

FIGS. 6A and 6B are perspective views each showing a configuration of magnetic circuit 307.

Magnetic circuit 307 is equipped with two yokes 321 aligned in the Y-axis direction. Yokes 321 have a U-shape when viewed from the X-axis direction. Inner walls 321b of each of two yokes 321 are separated in two pieces. On an inner side of outer wall 321a of each of yokes 321, magnet 322 is installed. Further, on an outer side of two walls 321b on an inner side of each of yokes 321, magnet 323 to face magnet 322 is installed. Between magnet 322 and magnet 323 facing each other, a gap into which coil 341 (refer to FIG. 8A) to be described later is inserted is created.

Magnetic circuit 307 is further equipped with two yokes 324 aligned in the X-axis direction. Yokes 324 have a U-shape when viewed from the Y-axis direction. Outer wall 324a of each of two yokes 324 is separated in two pieces, and inner wall 324b of each of two yokes 324 is also separated in two pieces. On an inner side of each of two walls 324a on an outer side of each of yokes 324, magnet 325 is installed. Further, on an outer side of each of two walls 324b on an inner side of each of yokes 324, magnet 326 to face magnet 325 is installed. Between magnet 325 and magnet 326 facing each other, a gap into which coil 341 (refer to FIG. 8A) to be described later is inserted is created. An end of each of magnets 326 in the Y-axis direction overlaps a side surface of inner wall 321b of adjacent yoke 321.

On each of lower surfaces of two yokes 321 and each of lower surfaces of two yokes 324, holes (not illustrated) are formed at positions into which bosses 314 of support base 306 illustrated in FIG. 5B are fitted. Yokes 321, 324 are installed on an upper surface of support base 306 such that bosses 314 are fitted into the holes formed in the lower surfaces of yokes 321, 324. As illustrated in FIG. 6B, magnetic circuit 307 is thus installed on the upper surface of support base 306.

Figure 7:
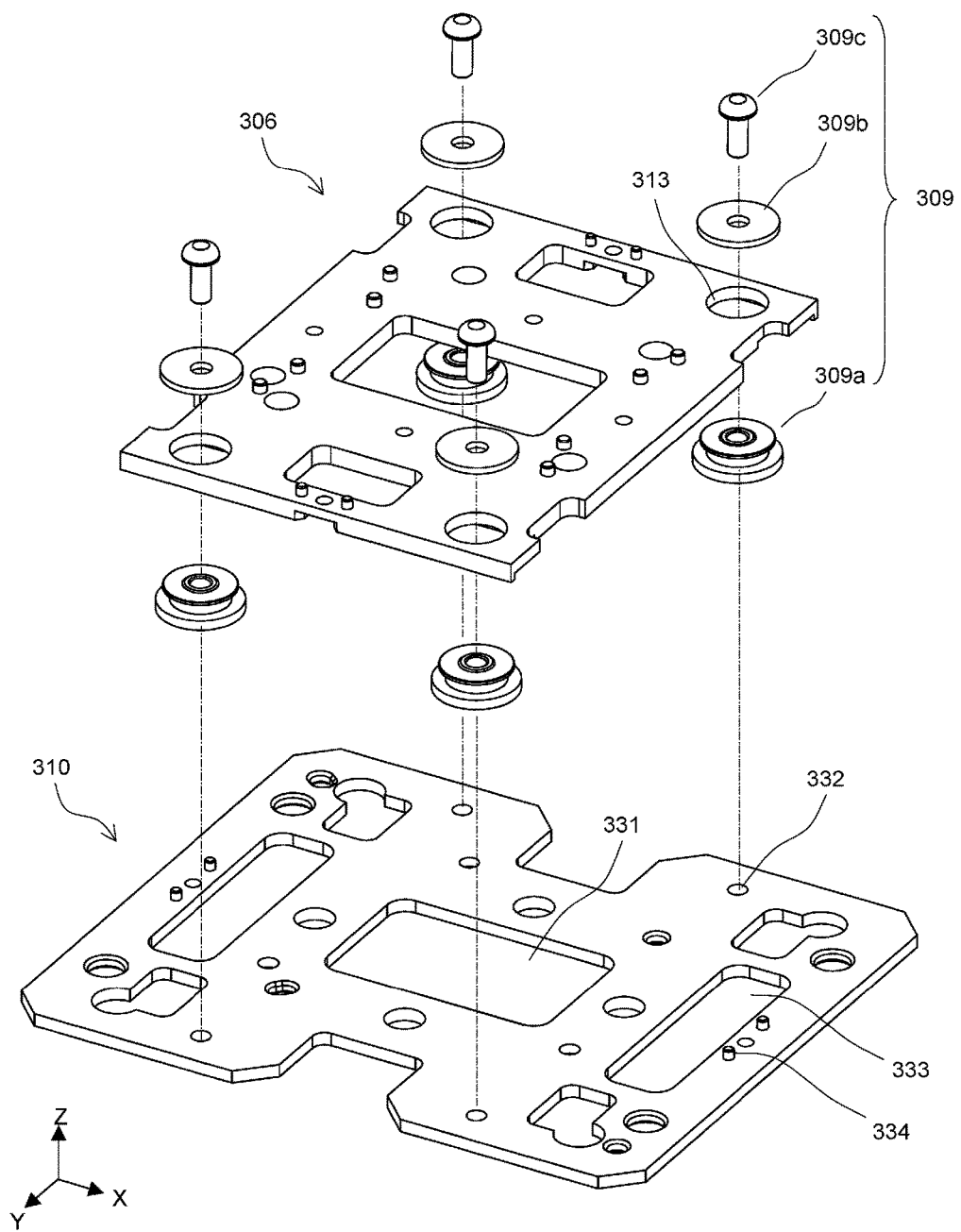
FIG. 7 is an exploded perspective view illustrating an assembly step of the support base and a fixed base according to the exemplary embodiment.

FIG. 7 is an exploded perspective view illustrating an assembly step of support base 306 and fixed base 310.

As illustrated in FIG. 7, each of damper units 309 includes damper 309a, washer 309b, and screw 309c. Fixed base 310 includes: opening 331 to let laser light pass through; screw holes 332 into which screws 309c are screwed; opening 333 in which position detection unit 400 is installed; and bosses 334 with which position detection unit 400 is positioned. Fixed base 310 is integrally formed of a highly rigid metal material.

Dampers 309a are integrally formed of a material excellent in damping property. Dampers 309a are formed of, for example, a material with high viscous damping such as αGEL or rubber. A sleeve in a cylindrical shape is fitted into a hole formed at a center of each of dampers 309a. Each of dampers 309a is fitted into hole 313 formed at each of four corners of support base 306. In this state, washers 309b are put on the upper surfaces of dampers 309a. Further, screws 309c are inserted into washers 309b and screwed in screw holes 332 of fixed base 310. By this step, support base 306 is supported by fixed base 310 via dampers 309a.

Figure 8A:
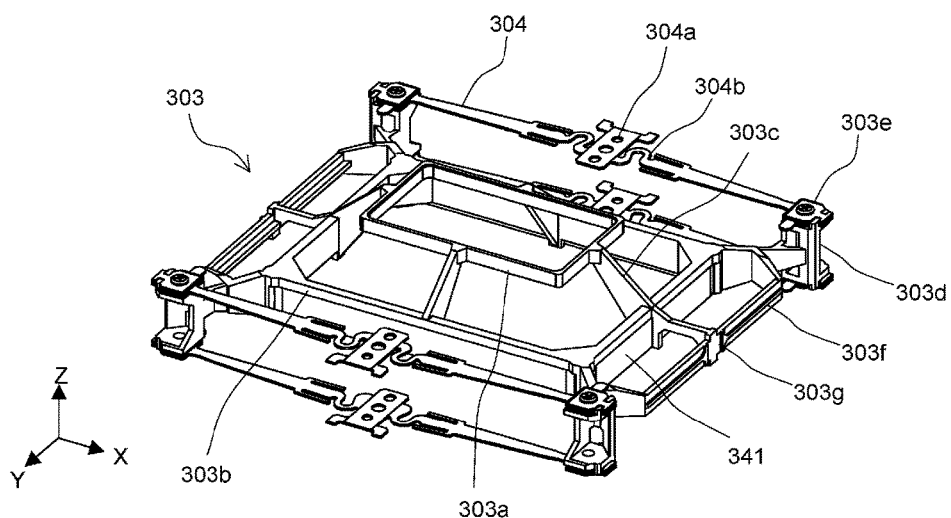
FIG. 8A is a perspective view illustrating a configuration of a support member and suspensions according to the exemplary embodiment when the support member and the suspensions are assembled.

FIG. 8A is a perspective view illustrating a configuration of support member 303 and suspensions 304 when support member 303 and suspensions 304 are assembled.

As illustrated in FIG. 8A, support member 303 has a frame shape. Support member 303 is formed of a lightweight and highly rigid material. In this exemplary embodiment, support member 303 is formed of a liquid crystal polymer in which a carbon filler is mixed. Support member 303 is equipped with inner frame 303a and outer frame 303b both in an approximately rectangular shape in a plan view. Inner frame 303a and outer frame 303b are connected to each other with four beams 303c such that a center of inner frame 303a and a center of outer frame 303b coincide with each other in a plan view. Inner frame 303a is elevated at a position shifted upward (the positive direction of the Z-axis) from outer frame 303b.

Structure body 301 is installed on an upper surface of inner frame 303a. In addition, coil 341 is mounted on a lower surface of outer frame 303b. Coil 341 turns around along the lower surface of outer frame 303b so as to form a shape in which corners of a rectangle are rounded.

Radially extending connection members 303d are respectively formed at four corners of outer frame 303b. Each of these connection members 303d has a flange on an upper end and a lower end. On an upper surface of the flange on an upper side of each of connection members 303d, an end of upper suspension 304 is fixed with fixing member 303e. Further, on a lower surface of the flange on a lower side of each of connection members 303d, an end of lower suspension 304 is fixed with fixing member 303e. In this manner, suspensions 304 are mounted on support member 303.

Further, support member 303 includes bridges 303f each connecting connection members 303d that are neighboring to each other in the Y-axis direction. A part of each bridge 303f except both ends in the Y-axis direction extends parallel to the Y-axis direction, and at a center of the part, installing surface 303g parallel to a Y-Z plane is provided. A scale is installed on installing surface 303g of bridge 303f, on the positive side of the X-axis, of support member 303.

Two suspensions 304 on the positive side of the Y-axis and two suspensions 304 on the negative side of the Y-axis are mounted on support units 305 as illustrated in FIG. 5A. In this step, coil 341 mounted on the lower surface of outer frame 303b is inserted into the gap between the mutually facing magnets of magnetic circuit 307 illustrated in FIG. 6B. Further, the scale installed on installing surface 303g of bridge 303f, on the positive side of the X-axis, of support member 303 faces the encoder installed on printed board 401 of position detection unit 400.

The encoder of position detection unit 400 includes an optical sensor that radiates light to the scale and receives light reflected from the scale, and the optical sensor optically detects movement of the scale in the Z-axis direction. On the basis of a detected signal from the encoder, a position of support member 303 and screens 108, 109 in the Z-axis direction is detected.

Driving of screens 108, 109 are thus controlled.

Note that magnetic poles of magnets 322, 323, 325, and 326 of magnetic circuit 307 illustrated in FIG. 6A and FIG. 6B are adjusted such that a drive signal (current) applied to coil 341 causes coil 341 to generate driving force in one direction parallel to the Z-axis direction.

Figure 8B:
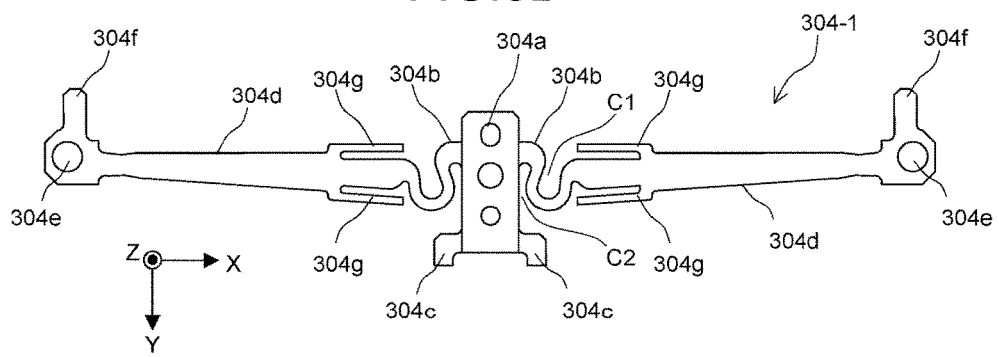
FIG. 8B is a plan view illustrating a configuration of suspensions according to the exemplary embodiment.
Figure 8C:
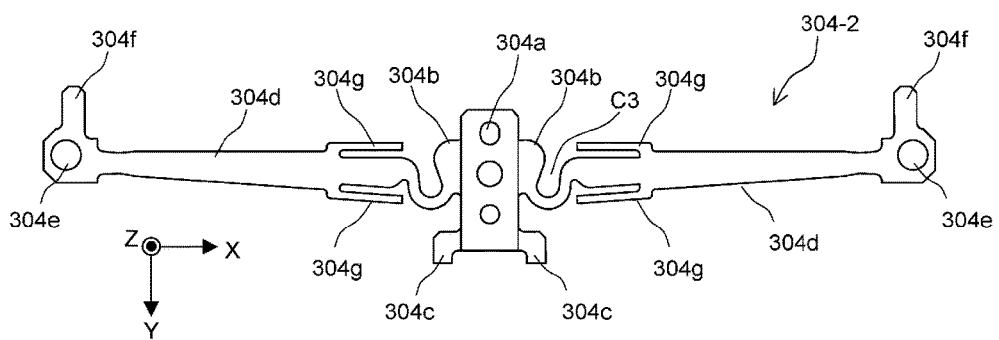
FIG. 8C is a plan view illustrating a configuration of suspensions according to the exemplary embodiment.

Each of FIG. 8B and FIG. 8C is a plan view illustrating a configuration of suspension 304.

In this exemplary embodiment, a shape of suspension 304 on an upper side (the positive side of the Z-axis) and a shape of suspension 304 on a lower side (the negative side of the Z-axis) illustrated in FIG. 8A are different from each other. Herein suspension 304 on the upper side is referred to as suspension 304-1, and suspension 304 on the lower side is referred to as suspension 304-2, for the sake of convenience.

Suspensions 304-1, 304-2 are thin plate-shaped members and are each integrally formed of a conductive and flexible metal material. Suspensions 304-1, 304-2 are made of a beryllium copper alloy, for example. Suspensions 304-1, 304-2 each have a symmetrical shape with respect to a central position in the X-axis direction. Suspensions 304-1, 304-2 each have three holes 304a, at the central position in the X-axis direction, for mounting suspension 304-1, 304-2 on support unit 305. Further, suspensions 304-1, 304-2 each have extensible structures 304b having a crank shape on both sides of three holes 304a.

Furthermore, suspensions 304-1, 304-2 each have a pair of flanges 304c protruding in the positive direction of the Y-axis. In addition, suspensions 304-1, 304-2 each have a pair of arms 304d extending in the X-axis direction, and have holes 304e at respective ends of those arms 304d. Furthermore, suspensions 304-1, 304-2 each have a pair of flanges 304f protruding from the respective ends of arms 304d in the negative direction of the Y-axis. Furthermore, suspensions 304-1, 304-2 each have a pair of hooks 304g on respective end sides of extensible structures 304b. When screens 108, 109 are reciprocated in the Z-axis direction, suspensions 304-1, 304-2 are deformed into an S-shape, in the Z-axis direction. Hooks 304g are disposed in each of suspensions 304-1, 304-2 so as to be positioned at respective inflection points of the deformation. As illustrated in FIG. 4A, hooks 304g are housed in gel covers 305a. Hooks 304g are provided to enhance a damping effect caused by the gel.

Extensible structures 304b of suspensions 304-1, 304-2 are different in shape from each other. In other words, each of extensible structures 304b of suspension 304-1 is formed by providing cutouts C1 and C2 from the negative and positive sides of the Y-axis, respectively. In contrast, each of extensible structures 304b of suspension 304-2 is formed by providing cutout C3 only from the negative side of the Y-axis. Structures of suspensions 304-1, 304-2 other than the shapes of extensible structures 304b are the same with each other.

Providing extensible structures 304b allows suspensions 304-1, 304-2 to easily warp in the Z-axis direction. This configuration allows support member 303 supporting structure body 301 and screens 108, 109 to be moved at a high speed in the Z-axis direction.

Further, since extensible structure 304b of upper suspension 304-1 is different from extensible structure 304b of lower suspension 304-2, buckling rigidity of suspension 304-1 can be different from buckling rigidity of suspension 304-2. The buckling rigidity herein indicates a degree of hardness in deformation of suspensions 304-1, 304-2 against external force (compression or tension) in the positive or negative direction of the X-axis, and can be denoted by (load/deformation quantity).

The buckling rigidity of upper suspension 304-1 is made different from the buckling rigidity of lower suspension 304-2 in this manner. Therefore, when support member 303 supporting structure body 301 and screens 108, 109 is reciprocated at a high frequency in the Z-axis direction, generation of excessive amplitude owing to a resonance mode can be suppressed.

Note that further effects exerted by suspensions 304-1, 304-2 will be described below in more detail with reference to FIGS. 18A to 19B.

Note that, in this exemplary embodiment, suspensions 304-1, 304-2 are shared as a feeding path of the drive signal for coil 341. In this exemplary embodiment, as described above, support member 303 is formed of the liquid crystal polymer in which the carbon filler is mixed, and therefore has conductivity. Accordingly, when suspensions 304-1, 304-2 are shared for feeding electricity, an attachment structure of suspensions 304-1, 304-2 to support member 303 needs to be electrically insulated.

Figure 9A:
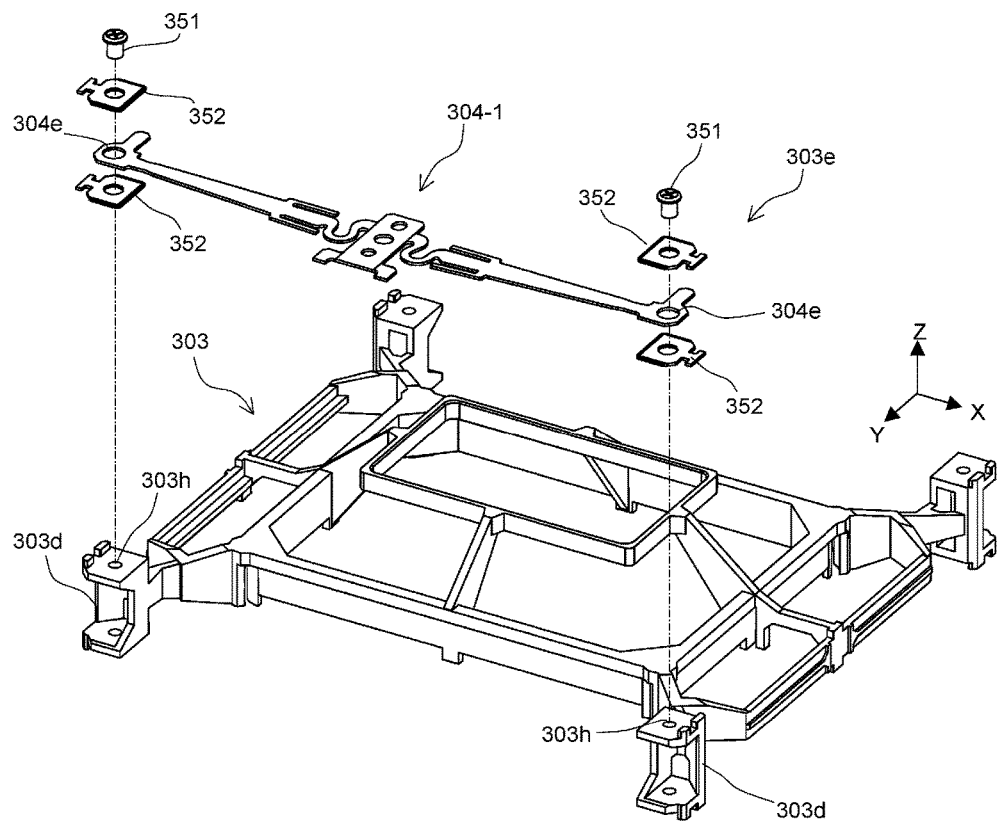
FIG. 9A is an exploded perspective view illustrating an attachment structure of the suspension to the support member according to the exemplary embodiment.
Figure 9B:
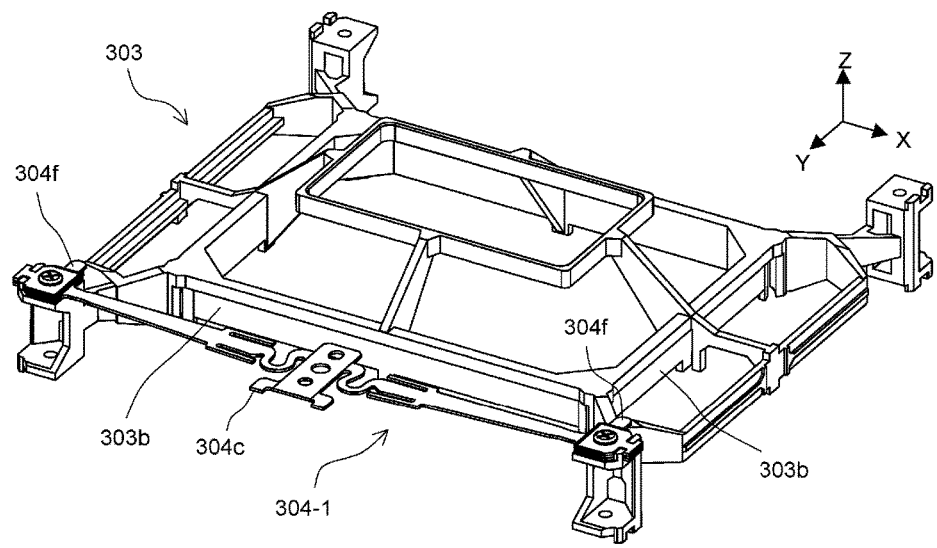
FIG. 9B is an exploded perspective view illustrating the attachment structure of the suspension to the support member according to the exemplary embodiment.

Each of FIG. 9A and FIG. 9B is an exploded perspective view of the attachment structure of suspension 304-1 to support member 303.

As illustrated in FIG. 9A, fixing member 303e includes screw 351 and two plate-shaped clampers 352. Upper and lower surfaces of each of two clampers 352 are subjected to an oxidation treatment. A hole is provided at a center of clamper 352. A diameter of a shaft of screw 351 is smaller than a diameter of the hole of clamper 352 and a diameter of hole 304e of suspension 304-1. Further, the diameter of hole 304e of suspension 304-1 is made larger than the diameter of the hole of clamper 352, and therefore screw 351 is not brought in contact with suspension 304-1.

While causing hole 304e of suspension 304-1 and the hole of clamper 352 to coincide with each other, the end of suspension 304-1 is interposed between two clampers 352. In this state, the end of suspension 304-1 is placed on an upper surface of connection member 303d of support member 303, and screw 351 is screwed into screw hole 303h of connection member 303d. This configuration allows the end of suspension 304-1 to be fixed to the upper surface of connection member 303d of support member 303, as illustrated in FIG. 9B. Similarly, lower suspension 304-2 is also fixed to a lower surface of connection member 303d.

Since the upper and lower surfaces of each of two clampers 352 are electrically insulated, even if the ends of suspensions 304-1, 304-2 are screwed in this manner, suspensions 304-1, 304-2 are not electrically conducted with support member 303. Therefore, suspensions 304-1, 304-2 can appropriately be used as the feeding path for coil 341.

After suspensions 304-1, 304-2 are thus mounted on support member 303, an end of coil 341 (refer to FIG. 8A) mounted on outer frame 303b of support member 303 is connected to flange 304f formed on the end of suspension 304-1 or suspension 304-2 by soldering. A lead wire for supplying the drive signal to coil 341 is connected to flange 304c of suspension 304-1 or suspension 304-2 by soldering. The drive signal is thus supplied to coil 341 through suspension 304-1 or suspension 304-2.

Next, a configuration of structure body 301 will be described with reference to FIGS. 10A to 14B.

Structure body 301 includes screens 108, 109, holder 361, heat resistant members 362, 363, and light shield members 364, 365.

Figure 10A:
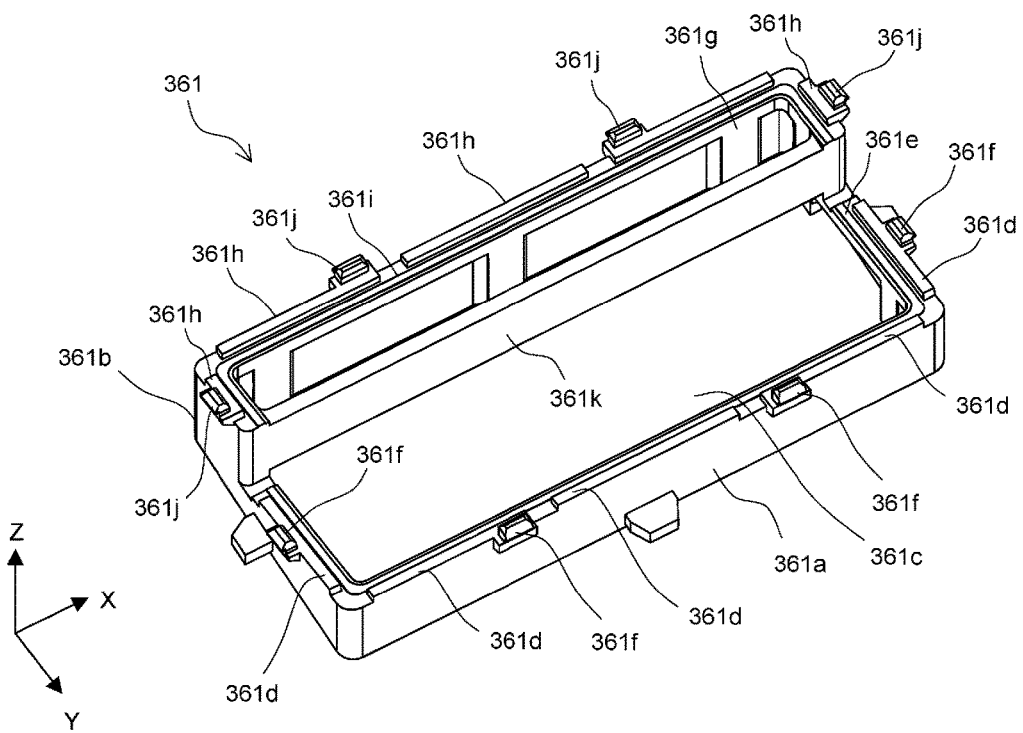
FIG. 10A is a perspective view illustrating a configuration of a holder according to the exemplary embodiment.
Figure 10B:
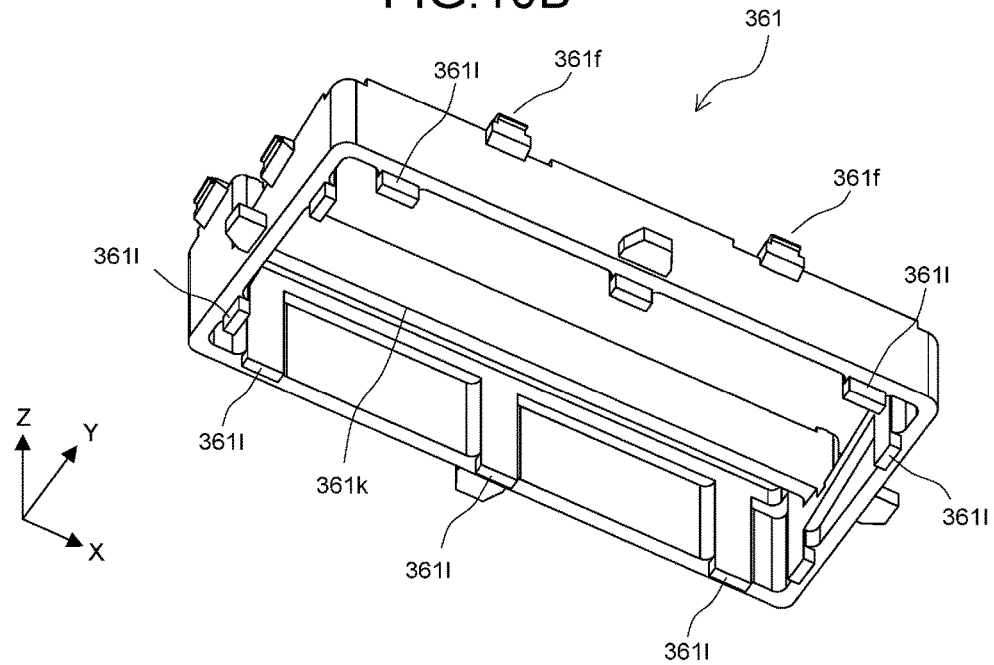
FIG. 10B is a perspective view illustrating the configuration of the holder according to the exemplary embodiment.
Figure 11:
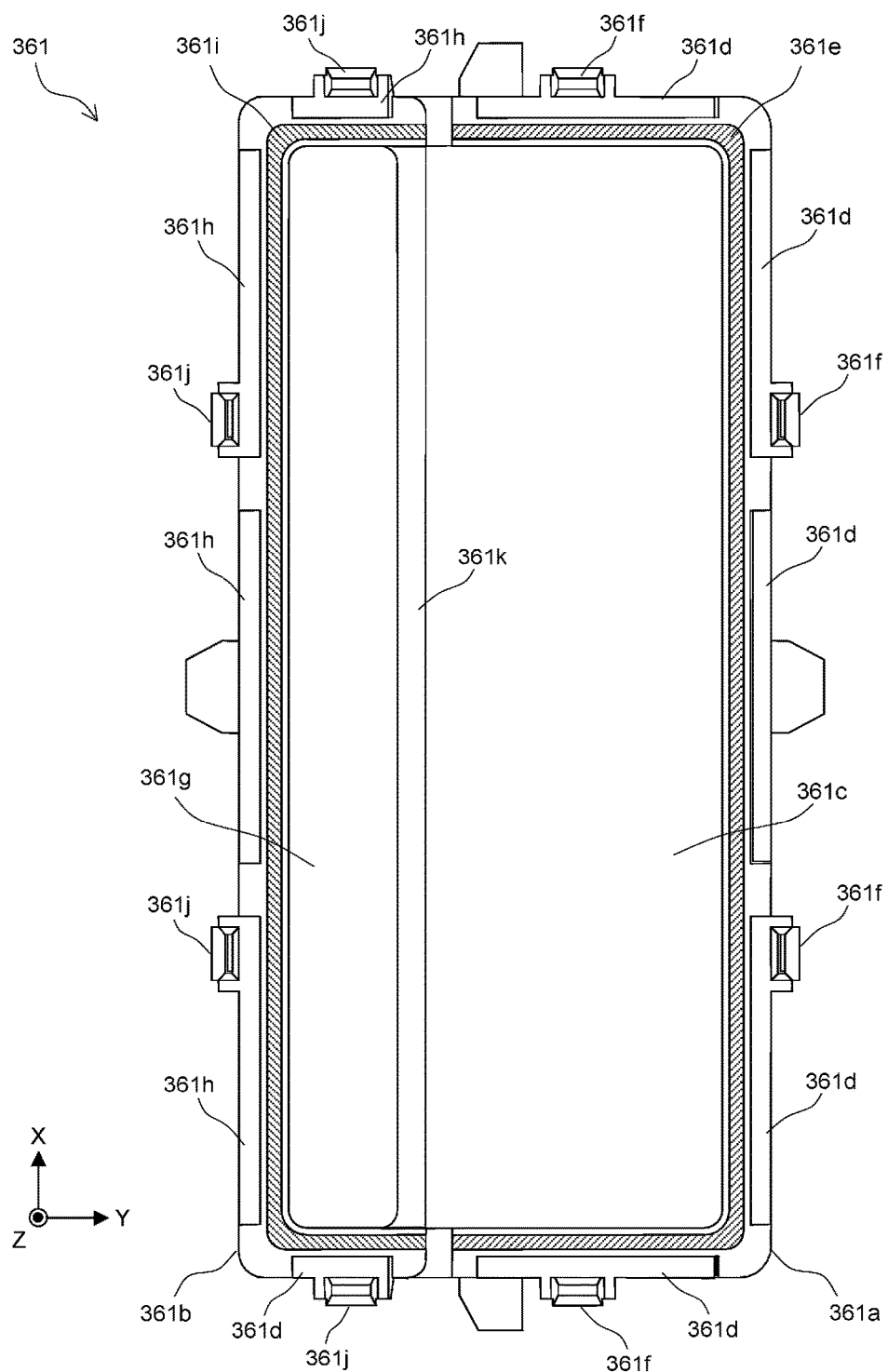
FIG. 11 is a plan view illustrating the configuration of the holder according to the exemplary embodiment.

FIG. 10A is a perspective view of a configuration of holder 361 viewed from above, and FIG. 10B is a perspective view of the configuration of holder 361 viewed from below. FIG. 11 is a plan view of holder 361 viewed from above. In FIG. 11, hatching is applied to regions of protuberances 361e and 361i, for the sake of convenience.

Holder 361 is formed of a frame-shaped member. Holder 361 is formed of a lightweight and highly rigid material. In this exemplary embodiment, holder 361 is integrally molded with a magnesium alloy. A shape of holder 361 is symmetry with respect to the X-axis direction.

Holder 361 has lower frame 361a for supporting screen 108 for the depth image, and upper frame 361b for supporting screen 109 for the fixed image.

Lower frame 361a has opening 361c having a rectangular shape in a plan view. Further, three walls 361d protruding upward are disposed at an edge portion of the positive side of the Y-axis on an upper surface of lower frame 361a. Also, walls 361d are respectively disposed at edge portions of the positive and negative sides of the X-axis on the upper surface of lower frame 361a. Protuberance 361e protruding upward is disposed between those walls 361d and opening 361c. Protuberance 361e is continuously formed so as to extend along a peripheral edge of opening 361c. Protuberance 361e is lower than walls 361d. Four hooks 361f protruding in the Z-axis direction are disposed at positions on outer sides of walls 361d on the upper surface of lower frame 361a.

Upper frame 361b has opening 361g having a rectangular shape in a plan view. Further, three walls 361h protruding upward are disposed at an edge portion of the negative side of the Y-axis on an upper surface of upper frame 361b. Also, walls 361h are respectively disposed at edge portions of the positive and negative sides of the X-axis on the upper surface of upper frame 361b. Protuberance 361i protruding upward is disposed between those walls 361h and opening 361g. Protuberance 361i is continuously formed so as to extend along a peripheral edge of opening 361g. Protuberance 361i is lower than walls 361h. Four hooks 361j protruding in the Z-axis direction are disposed at positions on outer sides of walls 361h on the upper surface of upper frame 361b.

A step between lower frame 361a and upper frame 361b is closed by wall 361k. An upper surface of wall 361k is made lower by one stage, by being dug downward (the negative direction of the Z-axis). Furthermore, on a lower surface of holder 361, ten protrusive pieces 361l protruding downward from an inner side of the lower surface are provided as illustrated in FIG. 10B. A contour of the lower surface of holder 361 coincides with a contour of inner frame 303a of support member 303 illustrated in FIG. 5A. When holder 361 is placed on inner frame 303a, ten protrusive pieces 361l of holder 361 are tightly fitted to an inner side of inner frame 303a. Holder 361 is thus positioned on support member 303.

Screen 108 for the depth image is placed on protuberance 361e of lower frame 361a, and is supported by holder 361. At this time, an end of screen 108 on the negative side of the Y-axis goes into a lower side of wall 361k. Protuberance 361e is formed so as to continuously extend along three sides of screen 108, when screen 108 is placed on protuberance 361e. In this state, screen 108 is housed in an inner part of five walls 361d, and a slight gap is produced between an outer periphery of screen 108 and walls 361d.

Screen 109 for the fixed image is placed on protuberance 361i of upper frame 361b, and is supported by holder 361. At this time, an end of screen 109 on the positive side of the Y-axis overlaps an upper side of wall 361k. Protuberance 361i is formed so as to continuously extend along three sides of screen 109, when screen 109 is placed on protuberance 361i. In this state, screen 109 is housed in an inner part of five walls 361h, and a slight gap is produced between an outer periphery of screen 109 and walls 361h.

Figure 12:
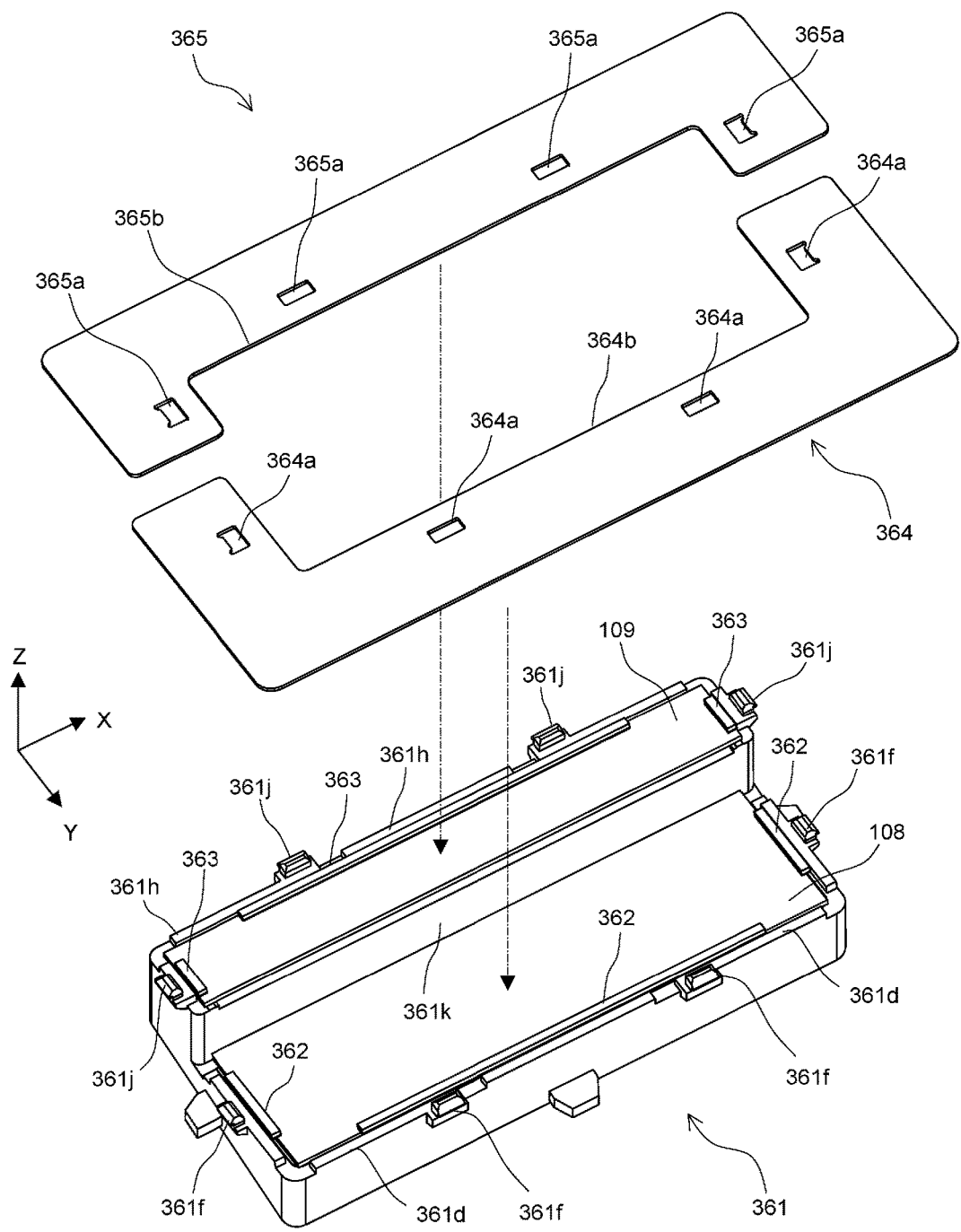
FIG. 12 is an exploded perspective view illustrating an attachment step of the light shield members to the holder according to the exemplary embodiment.
Figure 13:
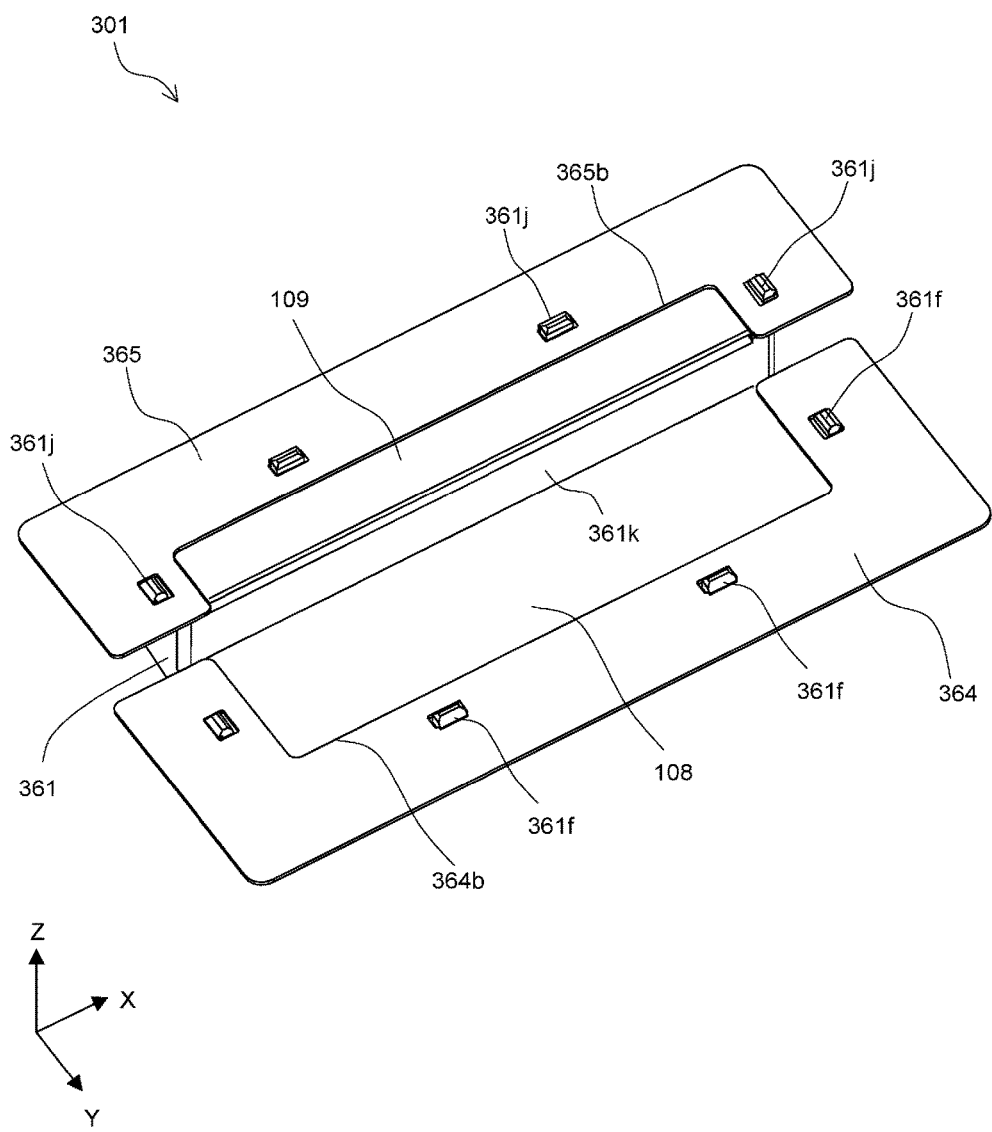
FIG. 13 is a perspective view illustrating a configuration of a structure body according to the exemplary embodiment when screens and the light shield members are attached to the holder.
Figure 14A:
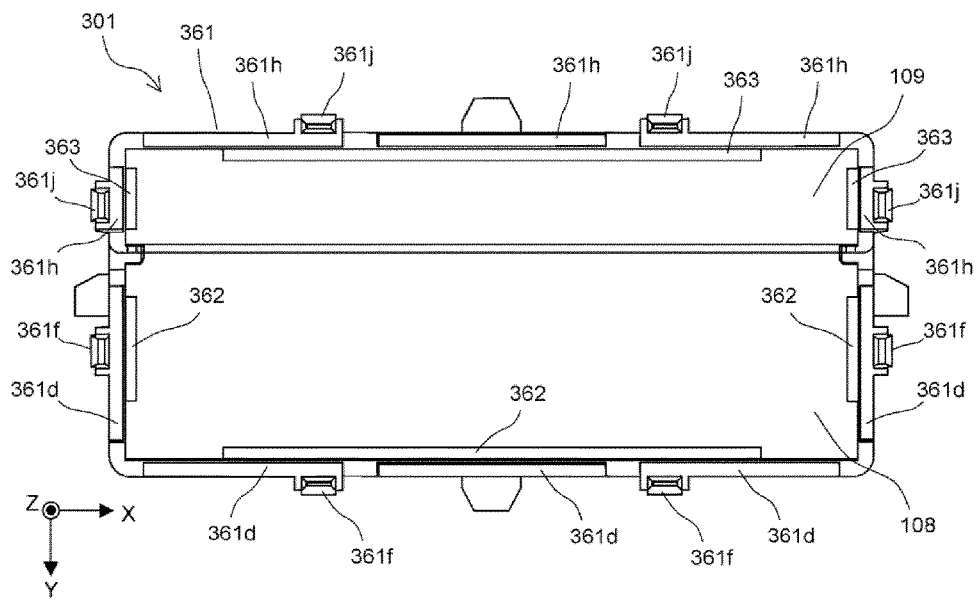
FIG. 14A is a plan view illustrating a configuration of the structure body according to the exemplary embodiment before the light shield members are mounted on the structure body.
Figure 14B:
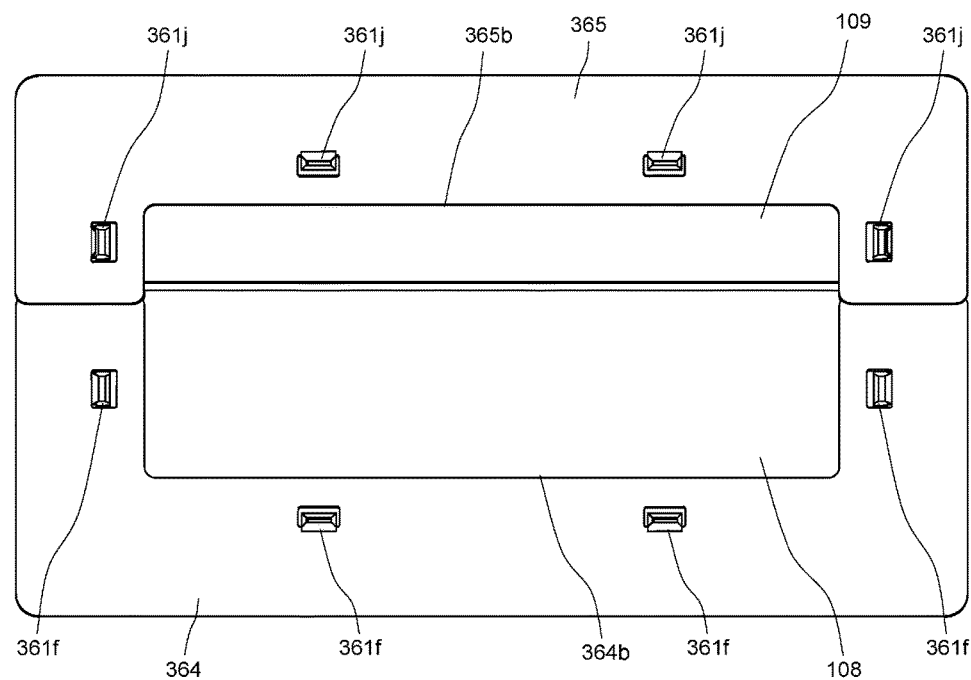
FIG. 14B is a plan view illustrating the configuration of the structure body according to the exemplary embodiment after the light shield members are mounted on the structure body.

FIG. 12 is an exploded perspective view illustrating an attachment step of light shield members 364, 365 to holder 361. FIG. 13 is a perspective view illustrating a configuration of structure body 301 when screens 108, 109 and light shield members 364, 365 are attached to holder 361. FIG. 14A is a plan view illustrating a configuration of structure body 301 before light shield members 364, 365 are mounted on structure body 301. FIG. 14B is a plan view illustrating the configuration of structure body 301 after light shield members 364, 365 are mounted on structure body 301.

As illustrated in FIG. 12 and FIG. 14A, heat resistant members (hereafter, referred to as "heat resistant packing members") 362, 363 are stuck on upper surfaces of screens 108, 109, respectively. Heat resistant packing members 362, 363 are respectively installed near edges of three sides of screens 108, 109 so as to be respectively positioned substantially right above protuberances 361e, 361i illustrated in FIG. 10A. Heat resistant packing members 362, 363 may be respectively stuck on screens 108, 109 before screens 108, 109 are respectively placed on protuberances 361e, 361i.

Heat resistant packing members 362, 363 are configured with an elastically deformable material excellent in heat resistance and heat insulation. Heat resistant packing members 362, 363 are formed of heat resistant silicon rubber, for example. Each of heat resistant packing members 362, 363 is a stick-shaped member having a square section. When screens 108, 109 are set to holder 361 as illustrated in FIG. 12, an upper surface of heat resistant packing member 362 is higher than the upper surface of wall 361d, and similarly an upper surface of heat resistant packing member 363 is higher than the upper surface of wall 361h.

As illustrated in FIG. 12, light shield members 364, 365 are made of a thin plate member. A thickness of each of light shield members 364, 365 is about 0.2 mm, for example. Light shield members 364, 365 are configured with a lightweight material excellent in heat resistance and light shielding property. Light shield members 364, 365 are formed of a magnesium alloy, for example.

Light shield member 364 has a shape in which a rectangular portion is cut out from a rectangle on the negative side of the Y-axis of the rectangle.

Light shield member 364 has holes 364a each of which is engaged with corresponding hook 361f of holder 361. Light shield member 364 has rectangular cutout 364b on the negative side of the Y-axis.

Light shield member 365 has a shape in which a rectangular portion is cut out from a rectangle on the positive side of the Y-axis of the rectangle.

Light shield member 365 has holes 365a each of which is engaged with corresponding hook 361j of holder 361. Light shield member 365 has rectangular cutout 365b on the positive side of the Y-axis.

Four holes 364a are respectively engaged with corresponding hooks 361f, thereby mounting light shield member 364 on lower frame 361a of holder 361. Similarly, four holes 365a are respectively engaged with corresponding hooks 361j, thereby mounting light shield member 365 on upper frame 361b of holder 361. At this time, heat resistant packing members 362, 363 are compressed in the Z-axis direction while generating reaction force. This reaction force secures engagement between hooks 361f, 361j and holes 364a, 365a, respectively, without loosening.

As illustrated in FIG. 13, FIG. 14A and FIG. 14B, assembly of structure body 301 is thus completed. In this state, a peripheral edge of light shield member 364 on an inner peripheral side overlaps an upper surface of a peripheral edge of screen 108 supported by protuberance 361e through heat resistant packing members 362. Further, a peripheral edge of light shield member 365 on an inner peripheral side overlaps an upper surface of a peripheral edge of screen 109 supported by protuberance 361i through heat resistant packing members 363. Screens 108, 109 are exposed upward respectively through cutouts 364b, 365b of light shield members 364, 365.

Structure body 301 thus assembled is placed on inner frame 303a of support member 303 illustrated in FIG. 5A to be bonded and fixed. At this time, protrusive pieces 361l (refer to FIG. 10B) on the lower surface of holder 361 are tightly fitted to the inner side of inner frame 303a. Attachment of structure body 301 to support member 303 is thus completed.

Subsequently, a positional relationship between screens 108, 109 and a display operation using screens 108, 109 will be described.

Figure 15A:
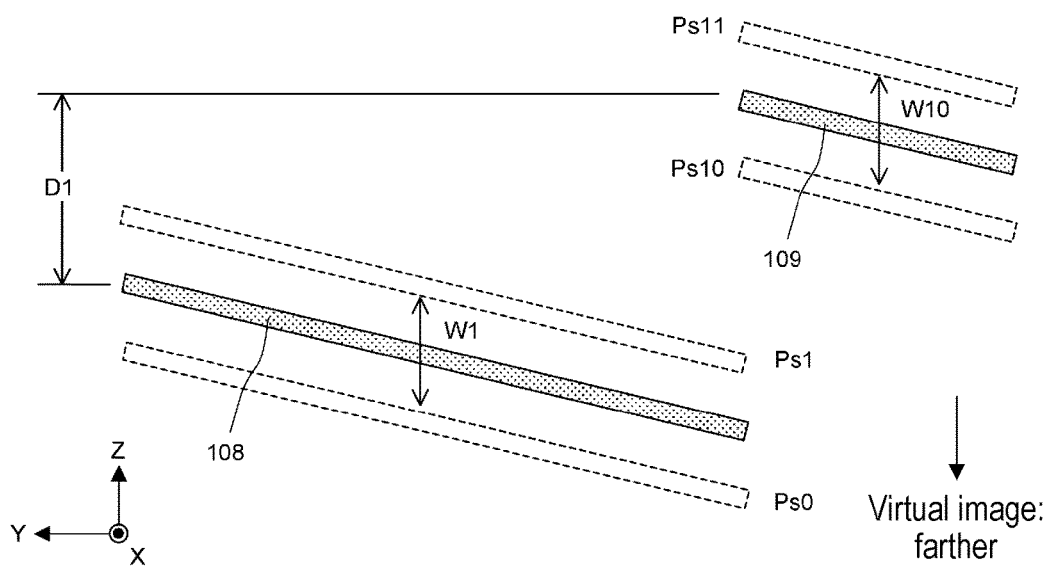
FIG. 15A is a view schematically illustrating a positional relationship between the two screens according to the exemplary embodiment.

FIG. 15A is a view schematically illustrating the positional relationship between screens 108, 109.

As described above, in this exemplary embodiment, screens 108, 109 are integrally supported by holder 361. Therefore, when screen 108 for the depth image is moved in the optical axis direction (Z-axis direction), screen 109 for the fixed image is simultaneously moved in the optical axis direction (Z-axis direction). For example, when screen 108 is moved within range W1 from position Ps0 to position Ps1 to generate the depth image, screen 109 for the fixed image is moved within range W10 from position Ps10 to position Ps11 upon generating the depth image. Herein a distance of range W1 and a distance of range W10 are equal to each other. Further distance D1 of a position shift between screen 108 and screen 109 is always constant during movement of screens 108, 109.

Note that a sight distance from driver 2 with respect to the image (virtual image) is made longer, as screens 108, 109 distant from mirror 22 in FIG. 1C more. In other words, position Ps0 is a boundary position of screen 108 on a farther sight-distance side, and position Ps1 is a boundary position of screen 108 on a nearer sight-distance side. Screen 109 is located at a position displaced on the positive side of the Z-axis from screen 108 by distance D1. Therefore an image (virtual image) displayed by screen 109 is displayed on the nearer sight-distance side than an image (virtual image) displayed by screen 108 is.

In this exemplary embodiment, position Ps11 is defined as a fixed position where screen 109 is fixed to display the fixed image. More specifically, the positional relationship (distance D1 of the position shift) between screens 108, 109 is set such that, when screen 108 for the depth image is positioned at the boundary position (position Ps1) on the nearer sight-distance side within the movement range (range W1) where screen 108 is moved to display the depth image, screen 109 for the fixed image is positioned at the fixed position (position Ps11) to display the fixed image. Screens 108, 109 are installed on holder 361 while keeping this positional relationship.

When the positional relationship between screens 108, 109 is set in this way, the depth image is displayed while moving screen 108 from position Ps0 to position Ps1, and then the fixed image can successively be displayed while stopping screen 109. In other words, when screen 108 for the depth image is moved to position Ps1 that is a terminating position of a display process of the depth image, screen 109 for the fixed image is positioned at the fixed position (position Ps11) to display the fixed image. Hence, after screen 108 for the depth image is moved to position Ps1, screen 109 for the fixed image needs not to be moved to the fixed position to display the fixed image while further driving holder 361. Thus, the display of the depth image and the display of the fixed image can be performed smoothly and stably through a series of operations.

Figure 15B:
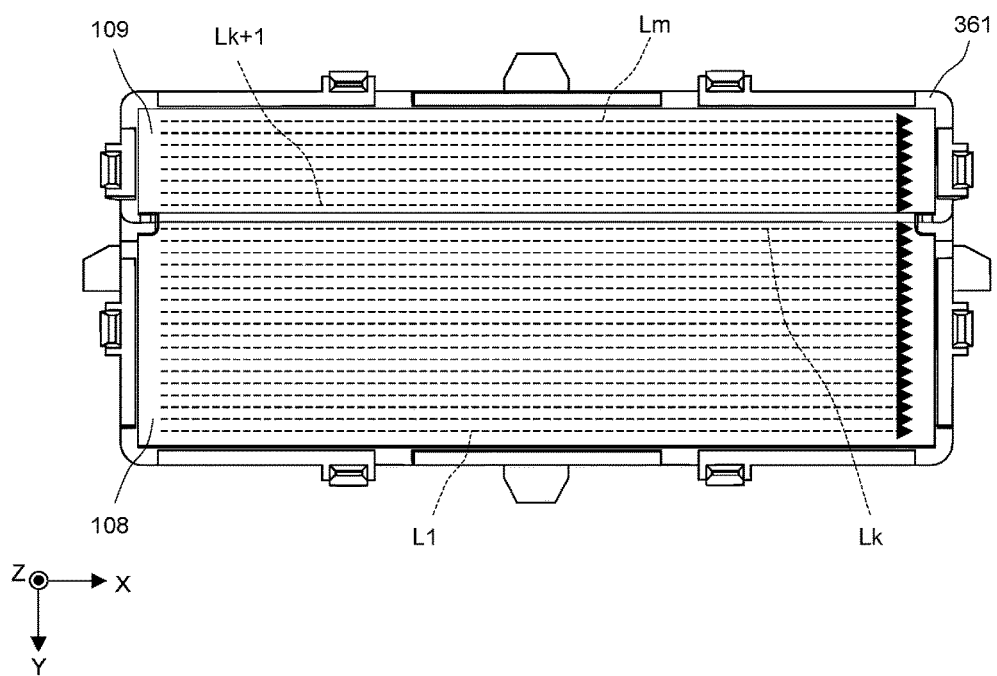
FIG. 15B is a view schematically illustrating a scanning method with respect to the two screens according to the exemplary embodiment.

FIG. 15B is a view schematically illustrating a scanning method of the laser beam with respect to screens 108, 109.

In an image display operation, screen 108 is first scanned by the laser beam. Screen 108 is sequentially scanned from scan line L1 set on the most positive side of the Y-axis to scan line Lk. During this scanning, holder 361 is moved to the positive side of the Z-axis, and screen 108 is moved from position Ps0 to position Ps1. In this process, the depth image is displayed. Holder 361 is then stopped, and screen 109 is fixed at position Ps11. In this state, screen 109 is sequentially scanned from scan line Lk+1 to scan line Lk. In this process, the fixed image is displayed.

Note that, in this exemplary embodiment, after the display operation of the fixed image is completed, an image whose sight distance is not varied (hereafter, referred to as a "vertical image") is displayed using screen 108 in a process in which screens 108, 109 are returned to positions Ps0, Ps10, respectively. The vertical image is an image for marking a pedestrian, for example, and is displayed being superimposed on the pedestrian at a position with a sight distance of the pedestrian. In this process, screen 108 is sequentially scanned from scan line Lk to scan line L1.

Figure 16A:
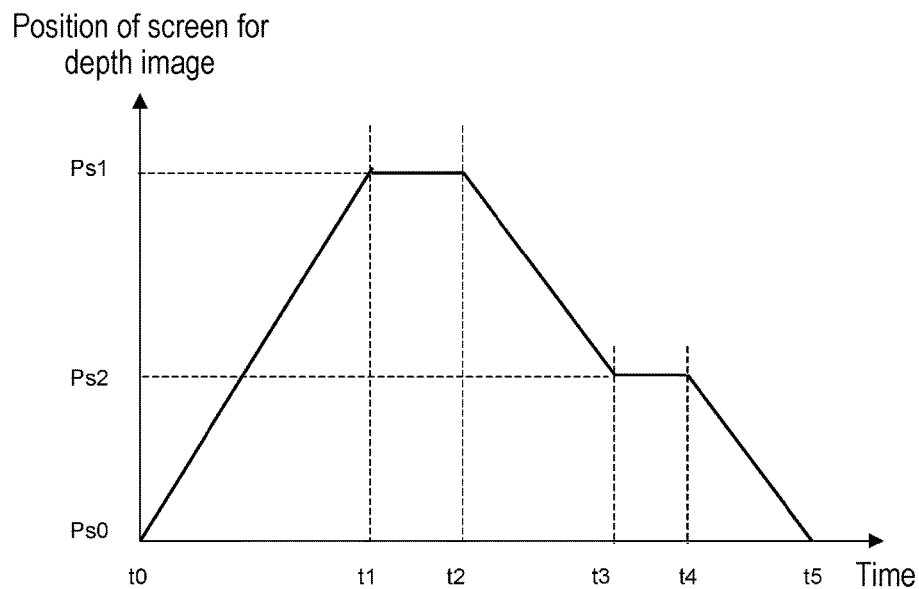
FIG. 16A is a graph illustrating a drive example of the screens according to the exemplary embodiment.
Figure 16B:
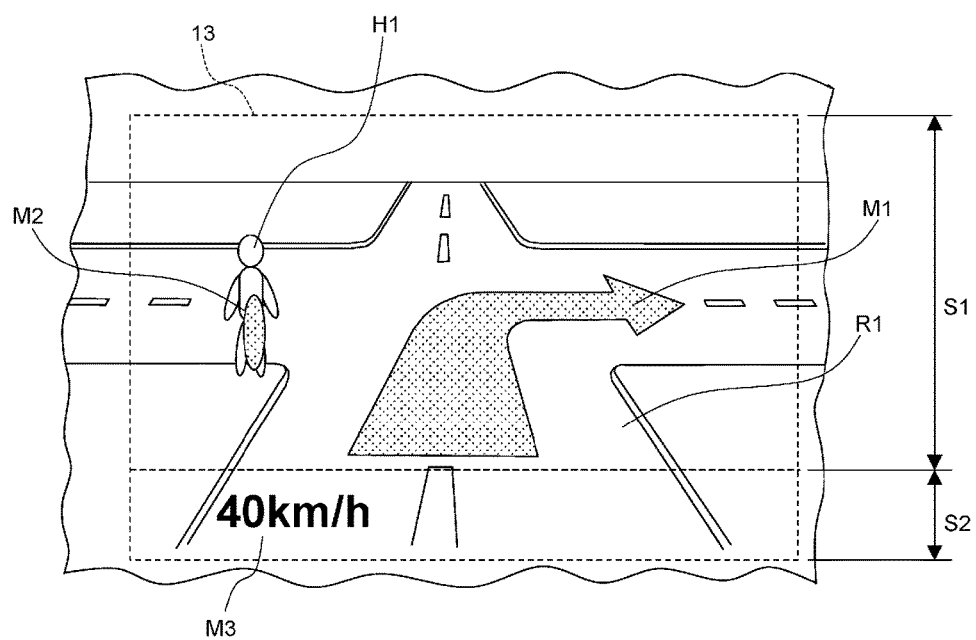
FIG. 16B is a view schematically illustrating a display example of an image according to the exemplary embodiment.

FIG. 16A is a graph illustrating a drive example of screen 108 when an image illustrated in FIG. 16B is displayed in region S1. In this exemplary embodiment, screen 109 is moved according to the movement of screen 108.

Screen 108 is repeatedly moved taking a period from time t0 to time t5 as one cycle. During a period from time t0 to time t1, screen 108 is moved from position Ps0 (farthest position) to position Ps1 (nearest position), and during a period from time t2 to time t5, screen 108 is returned from position Ps1 (nearest position) to position Ps0 (farthest position). During a period from time t1 to time t2, screen 108 is stopped at position Ps1 (nearest position). A movement cycle of screen 108, that is, the period from time t0 to time t5 is 1/60 seconds, for example. Screen 108 is moved as illustrated in FIG. 16A by changing a current applied to coil 341 described above while monitoring an output of the encoder in position detection unit 400.

In FIG. 16B, the period from time t0 to time t1 is a period for displaying depth image M1 extending in the depth direction, and the period from time t2 to time t5 is a period for displaying vertical image M2 extending in the vertical direction. In FIG. 16B, the period from time t1 to time t2 is a period for displaying fixed image M3 in region S2.

During the period from time t0 to time t1, laser light sources 101a to 101c are caused to emit light at timing corresponding to depth image M1 on scan lines corresponding to depth image M1 while screen 108 is linearly moved from position Ps0 to position PS1. Therefore, depth image M1 as illustrated in FIG. 16B is displayed in region S1 as a virtual image.

During the period from time t1 to time t2, screen 108 is stopped at position Ps1. Accordingly, screen 109 for the fixed image is stopped at position Ps11 that is the display position for fixed image M3. During this period, laser light sources 101a to 101c are caused to emit light at timing corresponding to fixed image M3 on scan lines corresponding to fixed image M3. Therefore fixed image M3 is displayed in region S2 ahead of projection region 13.

Further, during the period from time t2 to time t5, screen 108 is returned to position Ps0. At this time, screen 108 is stopped at position Ps2 during a period from time t3 to time t4. During this period, laser light sources 101a to 101c are caused to emit light at timing corresponding to vertical image M2 on scan lines corresponding to vertical image M2.

Therefore vertical image M2 as illustrated in FIG. 16B is displayed ahead of projection region 13 of windshield 12.

The above-described control is performed by image processing circuit 201 illustrated in FIG. 2. With this control, depth image M1 and vertical image M2 are displayed in region S1 as virtual images, and fixed image M3 is further displayed in region S2 as a virtual image, during the period from time t0 to time t5. In the above-described control, display timing of depth image M1, vertical image M2, and fixed image M3 includes a time shift, but the shifted time is extremely short. Then driver 2 recognizes an image on which depth image M1, vertical image M2, and fixed image M3 are superimposed.

In this manner, driver 2 can view an image based on the video signal (depth image M1, vertical image M2, and fixed image M3) while superimposing the image on a scene including road R1 and pedestrian H1.

Note that, in the example of FIG. 16B, one vertical image M2 is defined, and therefore one stop position (position Ps2) of screen 108 is set in the process of FIG. 16A. However, if a plurality of vertical images M2 is defined, a plurality of stop positions is set according to the plurality of vertical images M2 in the process of FIG. 16A. Note that, in the process of FIG. 16A, the period from time t0 to time t5 is constant, and time t5 is unchanged. Therefore the movement speed of screen 108 (slope of a waveform in FIG. 16A) before and after the stop positions is modified in response to increasing or decreasing of the number of stop positions.

<Effects of Exemplary Embodiment>

According to the above-described exemplary embodiment, the following effects are exerted.

Screen 108 and screen 109 are integrally supported by holder 361 and are simultaneously driven. Therefore generation of a gap between screens 108, 109 can be prevented, when viewed in a projection direction of light. Hence, it is possible to prevent a virtual image of the light emitting source of the light scanning screens 108, 109 from being visually recognized by the driver, through the gap between screens 108, 109. Accordingly, the images can be independently displayed by screens 108, 109 while preventing the virtual image of the light emitting source of light scanning screens 108, 109 from being visually recognized by the driver.

Figure 17A:
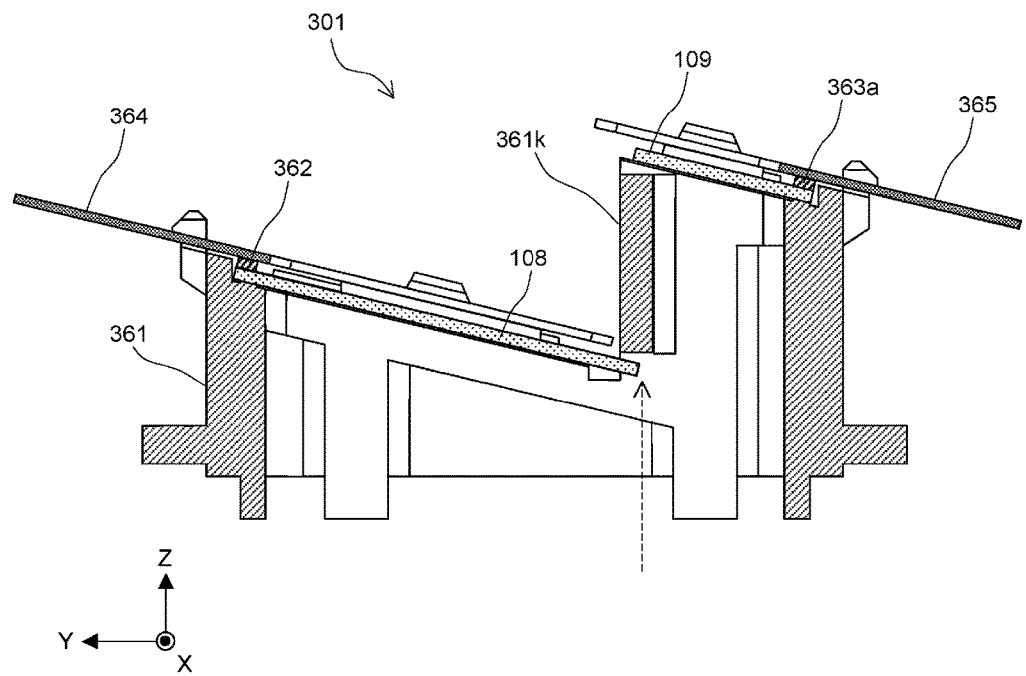
FIG. 17A is a cross-sectional view for describing an effect of the two screen installed on the holder according to the exemplary embodiment.

FIG. 17A is a view describing this effect. FIG. 17A illustrates a section of structure body 301 taken in a plane parallel to the Y-Z plane. In FIG. 17A, a broken line arrow indicates a ray of laser light that has been reflected by mirror 106a of scanning unit 106 and reaches near a boundary between screens 108, 109.

When viewed from the positive side of the Z-axis, the gap generated between screens 108, 109 leaks laser light that has been reflected by mirror 106a of scanning unit 106, and this leaked laser light enters eyes of driver 2. Thus, a virtual image of the light taking a reflection point of the laser light on mirror 106a as the light emission source is visually recognized by driver 2.

In contrast, in this exemplary embodiment, screens 108, 109 are installed on holder 361. Therefore, as illustrated in FIG. 17A, an end of screen 108 on the negative side of the Y-axis and an end of screen 109 on the positive side of the Y-axis can be overlapped each other in the Z-axis direction. Therefore, in this exemplary embodiment, no gap is generated between screens 108, 109, when viewed from the positive side of the Z-axis. This configuration can prevent the virtual image of light taking the reflection point on mirror 106a as the light emission source from being visually recognized by driver 2.

Furthermore, in this exemplary embodiment, wall 361k is formed in holder 361 to close the step between an end of screen 108 facing screen 109 and an end of screen 109 facing screen 108 as illustrated in FIG. 17A. This configuration can securely prevent leakage of light of the light emission source from a boundary portion between screen 108 and screen 109. For example, even when the laser light reflected by mirror 106a is slightly diffused and enters a portion of the step between screens 108, 109, this laser light is blocked by wall 361k, thereby prohibiting leakage from the portion of the step. Hence, it is possible to more securely prevent the virtual image of the light emitting source of the light scanning screens 108, 109 from being visually recognized by the driver.

As described with reference to FIG. 15A, screen 108 and screen 109 are installed on holder 361 such that, when screen 108 is positioned at one boundary position (position Ps1) within the movement range in which screen 108 is moved to display the depth image, screen 109 is positioned at the fixed position (position Ps11) to display the fixed image. With this configuration, screen 108 is moved from position Ps0 to position Ps1 to display the depth image, and then the fixed image can successively be displayed while stopping screen 109. Thus, the display of the depth image and the display of the fixed image can be performed smoothly and stably through a series of operations.

Note that, in this exemplary embodiment, the positional relationship between screen 108 and screen 109 is set such that, when screen 108 is positioned at a boundary position (position Ps1) on the nearer sight-distance side within the movement range (range W1), screen 109 is positioned at the fixed position (position Ps11). Otherwise, the positional relationship between screen 108 and screen 109 may be set such that, when screen 108 is positioned at a boundary position (position Ps0) on the farther sight-distance side within the movement range (range W1), screen 109 is positioned at the fixed position (position Ps11). In this case, the depth image is displayed while screen 108 is moved from position Ps1 to position Ps0, and then screen 108 is stopped at position Ps0 and the fixed image is displayed by screen 109.

However, when the positional relationship between screens 108, 109 is set in this manner, the distance between screens 108, 109 in the optical axis direction (Z-axis direction) is increased. Therefore holder 361 is increased in size in the optical axis direction (Z-axis direction). In contrast, as in the above-described exemplary embodiment, the positional relationship between screens 108, 109 is set such that, when screen 108 is positioned at the boundary position (position Ps1) on the nearer sight-distance side within the movement range (range W1), screen 109 is positioned at the fixed position (position Ps11). This configuration can suppress the distance between screens 108, 109 to be small and can achieve downsizing of holder 361. Then holder 361 can be decreased in weight, and screens 108, 109 can accurately be driven more stably.

Note that, in this exemplary embodiment, the stray light including natural light can be taken in from the outside and can be introduced into image display device 20. In this case, since the stray light is condensed to peripheries of screens 108, 109 by mirror 22, stray light with high intensity is irradiated to the peripheries of screens 108, 109. This possibly causes holder 361 to become considerably high in temperature.

To solve this problem, in this exemplary embodiment, screens 108, 109 are respectively covered by light shield member 364, 365 through heat resistant packing members 362, 363 while being respectively placed on protuberances 361e, 361i illustrated in FIG. 10A, as illustrated in FIG. 12. This configuration allows the stray light that goes backward through mirror 22 and approaches a portion of holder 361 around screens 108, 109 to be blocked by light shield members 364, 365. Therefore this portion of holder 361 is prevented from becoming high in temperature by the stray light. Accordingly, screens 108, 109 can be prevented from receiving damage by heat from holder 361.

Further heat resistant packing members 362, 363 are respectively interposed between light shield members 364, 365 and upper surfaces of screens 108, 109. Therefore, even when light shield members 364, 365 become high in temperature by the stray light, heat propagation from light shield members 364, 365 to screens 108, 109 can be prevented. Accordingly, damage of screens 108, 109 due to the heat from light shield members 364, 365 can be prevented.

Furthermore screens 108, 109 are installed on holder 361 such that peripheral edges of screens 108, 109 are respectively supported by protuberances 361e, 361i. Therefore even when the stray light enters positions of holder 361 right below the peripheral edges of screens 108, 109 from around inner peripheral edges of light shield members 364, 365, and those positions right below the peripheral edges of screens 108, 109 become high in temperature, heat at those positions right below the peripheral edges of screens 108, 109 does not directly propagate to screens 108, 109. Therefore screens 108, 109 can be prevented from being damaged by heat from those positions right below the peripheral edges of screens 108, 109.

Figure 17B:
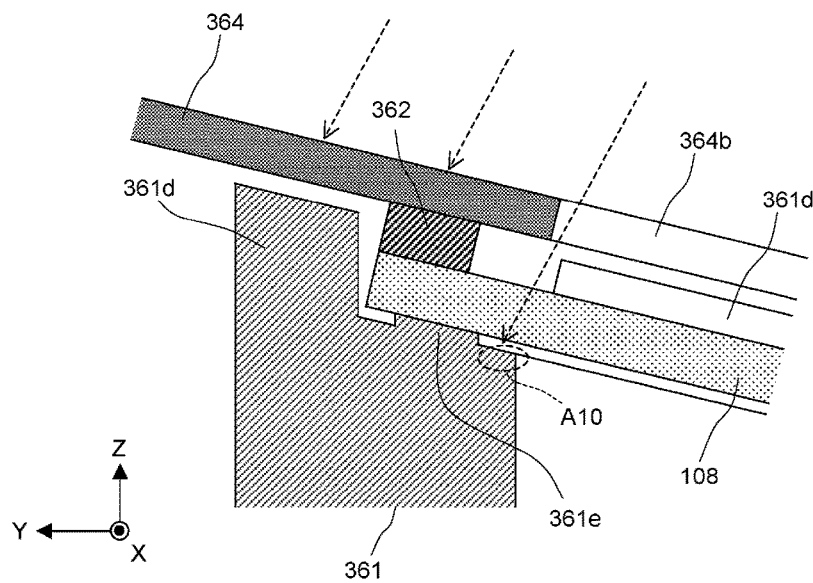
FIG. 17B is a cross-sectional view schematically illustrating an effect of the light shield member, a heat insulation member, and a protuberance according to the exemplary embodiment.

FIG. 17B is a view for describing the above-described effect. FIG. 17B illustrates a section of an end of holder 361 on the positive side of the Y-axis taken in a plane parallel to the Y-Z plane. In FIG. 17B, broken line arrows indicate the stray light.

As illustrated in FIG. 17B, the majority of light approaching an upper surface of holder 361 is blocked by light shield member 364. However, a part of the stray light enters region A10 of holder 361 passing through an inner side of light shield member 364. Region A10 becomes considerably high in temperature owing to irradiation of the stray light. However, since the peripheral edge of screen 108 is placed on protuberance 361e, a gap is generated between screen 108 and region A10 and therefore heat in region A10 does not directly propagate to screen 108. Accordingly, screen 108 can be prevented from being damaged by heat generated in region A10.

Note that the heat generated in region A10 spreads to the inside of holder 361, and a part of the heat propagates to protuberance 361e. However the heat disperses before propagating to protuberance 361e, and therefore protuberance 361e does not become so high in temperature. Accordingly, even when protuberance 361e is brought in contact with screen 108, screen 108 is not damaged by heat from protuberance 361e. Similarly, other parts of the peripheral edge of screen 108 are prevented from being damaged by heat owing to protuberance 361e extending along the periphery edge. Screen 109 is also prevented from being damaged by heat owing to protuberance 361e.

As illustrated in FIG. 10A, FIG. 10B, and FIG. 11, protuberances 361e, 361i are continuously provided along three sides of screen 108 and three sides of screen 109, respectively. Screens 108, 109 each have a rectangular contour. This allows screens 108, 109 to be stably supported by protuberances 361e, 361i, respectively. Protuberances 361e, 361i may discontinuously be disposed along the three sides of screen 108 and the three sides of screen 109, respectively.

Note that protuberances 361e, 361i do not necessarily have to be formed integrally with holder 361. Protuberances 361e, 361i may be configured by installing other members on holder 361. However, when protuberances 361e and 361i are integrally formed with holder 361 in advance as in the above-described exemplary embodiment, a procedure for installing the other members configuring protuberances

361e, 361i on holder 361 can be omitted. This can simplify an assembly procedure of structure body 301 more.

<Effect of Suspension>

According to suspensions 304-1, 304-2 in the above-described exemplary embodiment, the following effect can further be exerted.

Figure 18A:
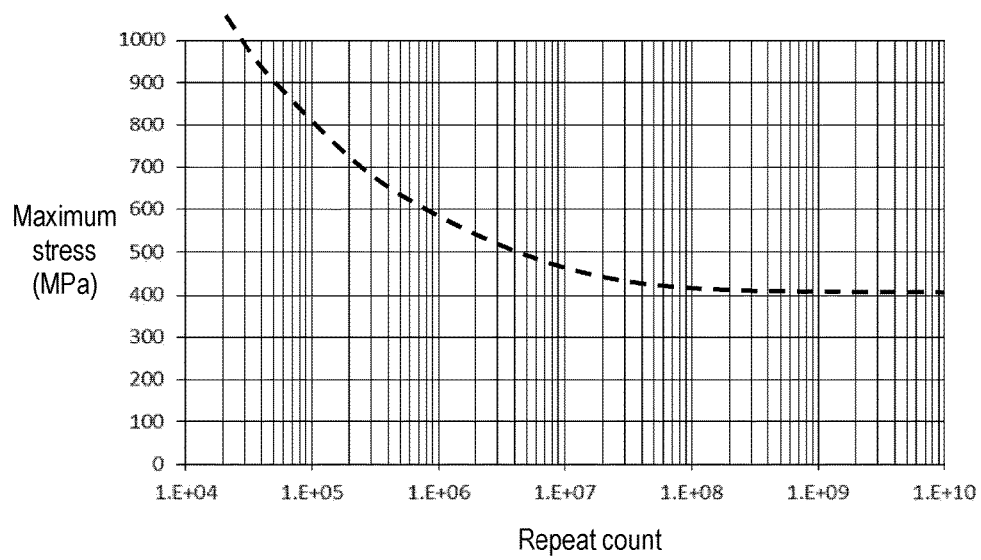
FIG. 18A is a graph illustrating fatigue characteristics of beryllium-copper alloy 25 used for the suspensions according to the exemplary embodiment.

FIG. 18A is a graph illustrating fatigue characteristics of beryllium-copper alloy 25 used for suspensions 304-1, 304-2.

In FIG. 18A, a vertical axis indicates the maximum stress given to this metal, and a horizontal axis indicates a repeat count until the metal is broken when bending is iteratively repeated with the stress indicated by the vertical axis. The fatigue characteristics in FIG. 18A are verified by the inventor of the present disclosure.

With reference to FIG. 18A, it can be understood that, when the maximum stress is suppressed to about 300 MPa, the repeat count of breaking limit can extended up to $10^{10}$ times or more.

Figure 18B:
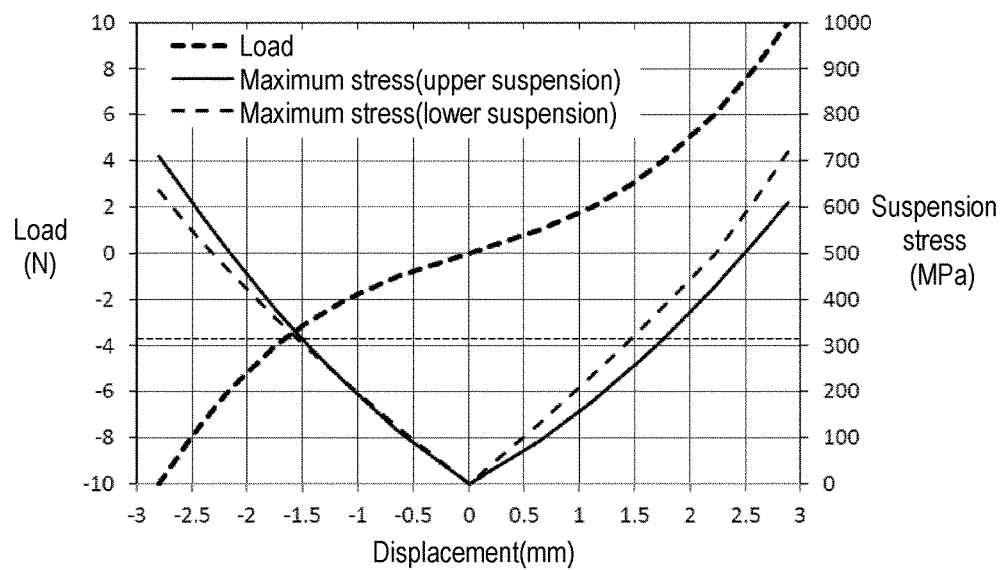
FIG. 18B is a graph illustrating characteristics of the suspensions according to the exemplary embodiment.

FIG. 18B is a graph illustrating characteristics of suspensions 304-1, 304-2 used in the above-described exemplary embodiment.

FIG. 18B includes a graph indicating a load necessary to displace a center position of each of suspensions 304-1, 304-2 by a displacement amount indicated by a horizontal axis, and a graph indicating the maximum stress generated in suspensions 304-1, 304-2 when the center position of each of suspensions 304-1, 304-2 is displaced by the displacement amount indicated by the horizontal axis. Since spring constants of suspensions 304-1, 304-2 are equal to each other, the graph of the load is common for suspensions 304-1, 304-2. Each graph in FIG. 18B is obtained from simulation performed by the inventor of the present disclosure.

Herein each of suspensions 304-1, 304-2 has 71.4 mm in total length and has 0.3 mm in thickness. Each of suspensions 304-1, 304-2 is made of beryllium-copper alloy 25. Effective lengths of two portions of each of suspensions 304-1, 304-2 excluding a center portion (fixed portion) and ends (support portions) are 29.1 mm.

With reference to FIG. 18B, a load necessary to reciprocate a center position of each of suspensions 304-1, 304-2 with a range of ±1.5 mm in the Z-axis direction is about 4 N. Furthermore, when the center position of each of suspensions 304-1, 304-2 is reciprocated with the range of ±1.5 mm in the Z-axis direction, the maximum stress generated in each of suspensions 304-1, 304-2 slightly exceeds 300 MPa. In contrast, with reference to FIG. 18A, the repeat count of breaking limit when the maximum stress slightly exceeds 300 MPa is $10^{10}$ times or more. Accordingly, by using suspensions 304-1, 304-2, screens 108, 109 can be reciprocated $10^{10}$ times or more, that is, semipermanently.

Figure 19A:
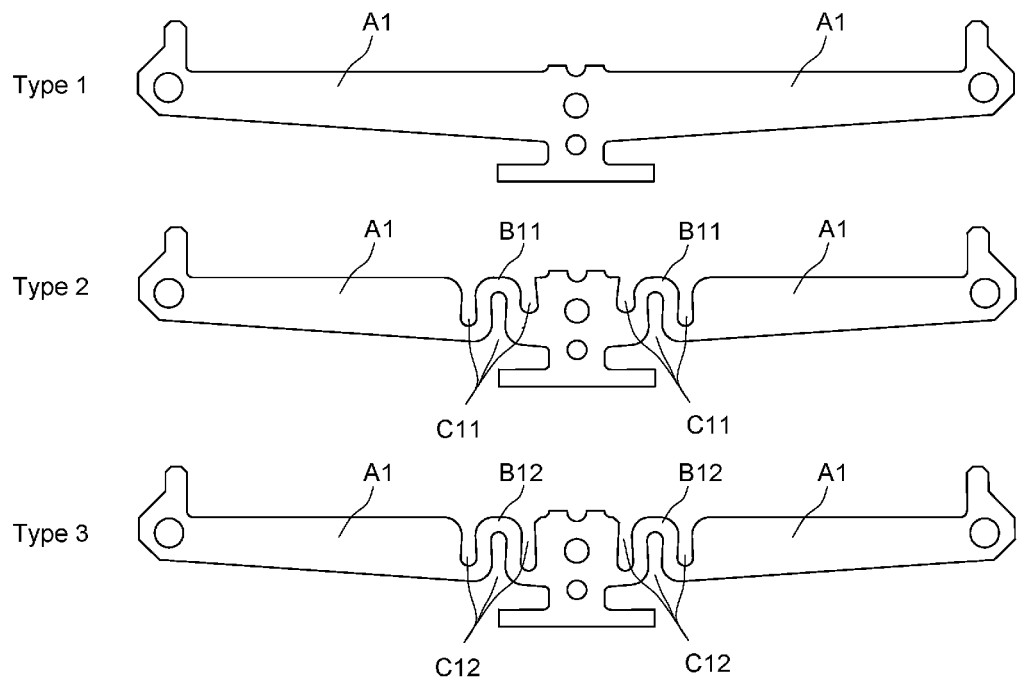
FIG. 19A is a plan view illustrating configurations of suspensions according to a comparative example.

FIG. 19A is a plan view illustrating configurations of suspensions (Type 1, 2, and 3) according to a comparative example.

In the suspension of Type 1, no extensible structure is provided between a center portion and arms A1. In the suspension of Type 2, extensible structures B11 are provided by providing cutouts C11 between a center portion and arms A1. Similarly, in the suspension of Type 3, extensible structures B12 are provided by providing cutouts C12 between a center portion and arms A1. However, shapes of extensible structures B11, B12 are different from shapes of extensible structures 304b of suspensions 304-1, 304-2 (refer to FIG. 8B and FIG. 8C). Further, widths of arms A1 of the suspensions of Type 1 to Type 3 are set broader than those of suspensions 304-1, 304-2.

Figure 19B:
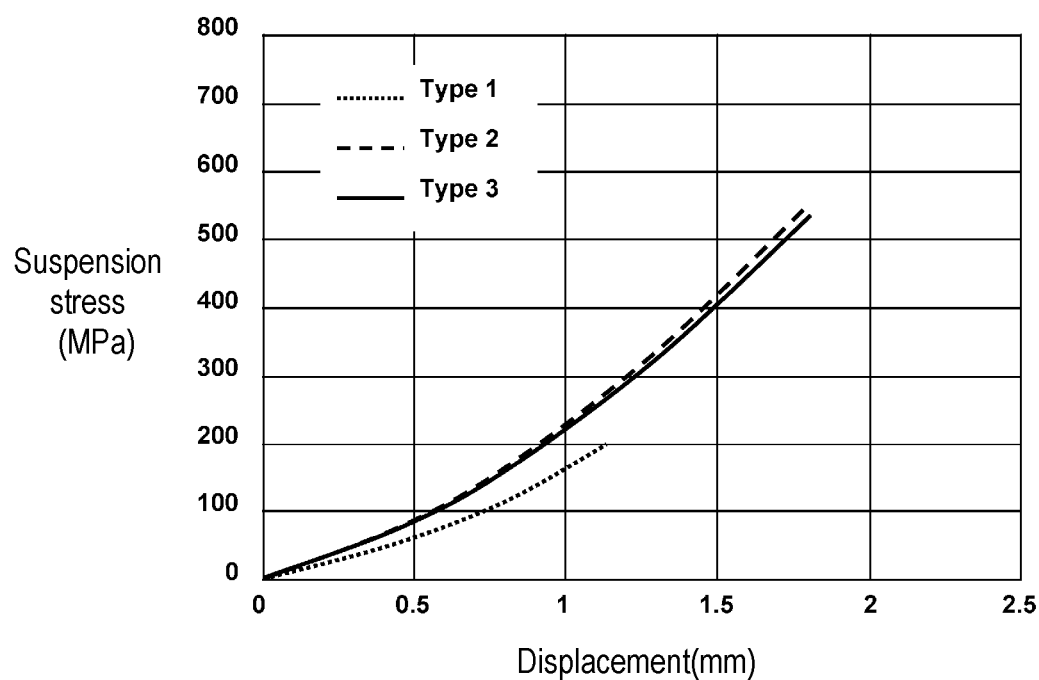
FIG. 19B is a graph indicating a relationship between a displacement amount and a stress of each of the suspensions according to the comparative example.

FIG. 19B is a graph indicating a relationship between a displacement amount and a stress of each of the suspensions according to the comparative example (Type 1, 2, and 3).

Herein each of the suspensions of Type 1 to Type 3 has 72.8 mm in total length and has 0.2 mm in thickness. Each of the suspensions of Type 1 to Type 3 is made of beryllium-copper alloy 25. Effective lengths of two portions of each of the suspensions of Type 1 to Type 3 excluding a center portion (fixed portion) and ends (support portions) are 29.1 mm. Thicknesses of the suspensions of Type 2 and Type 3 are set large, to set spring constants of the suspensions of Type 2 and Type 3 to be equal to spring constants of suspensions 304-1, 304-2.

When the center position of each of suspensions of Type 2 and Type 3 is reciprocated with the range of ±1.5 mm in the Z-axis direction, the maximum stress generated in each of those suspensions slightly exceeds 400 MPa. In contrast, with reference to FIG. 18A, the repeat count of breaking limit when the maximum stress slightly exceeds 400 MPa is about $10^8$ times. Accordingly, the repeat count of breaking limit when the suspensions of Type 2 and Type 3 are used is considerably reduced, in comparison with a case where suspensions 304-1, 304-2 in the above-described exemplary embodiment are used.

Note that, in the suspension of Type 1, no extensible structure is provided, and therefore its maximum stress is suppressed to about 300 MPa, similar to suspensions 304-1, 304-2 in the above-described exemplary embodiment. However, the suspension of Type 1 is provided with no extensible structure, and therefore the suspension of Type 1 is hardly warped in the Z-axis direction. Accordingly, a load necessary for reciprocating the center of the suspension with the range of ±1.5 mm is remarkably increased.

As studied in the above-described verification, use of suspensions 304-1, 304-2 in the above-described exemplary embodiment can remarkably improve life time of suspensions 304-1, 304-2 while suppressing the load, when the center of each of suspensions 304-1, 304-2 is reciprocated with the range of ±1.5 mm. Note that, when such an effect is not needed, the shapes of suspensions 304-1, 304-2 may not necessarily be the shapes illustrated in FIG. 8B, FIG. 8C, respectively, but the suspensions illustrated in FIG. 19A may be used, for example. Also in this case, the buckling rigidity of the upper suspension is preferably set different from the buckling rigidity of the lower suspension.

Modification Example

Although the exemplary embodiment of the present disclosure has been described above, the present disclosure is not limited to the exemplary embodiment described above, and moreover, a variety of modifications can be applied to application examples according to the present disclosure besides the exemplary embodiment described above.

For example, in the above-described exemplary embodiment, although two screens 108, 109 are installed on holder 361, a number of screens to be installed on holder 361 is not limited to two. For example, two screens for the fixed image may be disposed at positions whose sight distances are different from each other, together with the screen for displaying the depth image. In this case, when the screen for the depth image is positioned at the boundary position within the movement range, the two screens for the fixed image may be positioned at positions to display the fixed images with respective sight distances. A plurality of screens for the depth image may be disposed.

Furthermore, in the above-described exemplary embodiment, the image is displayed by screen 109 in a state in which screen 109 is stopped. However the image may be displayed by screen 109 while moving screen 109.

Furthermore, in the above-described exemplary embodiment, screens 108, 109 are installed on structure body 301 while being inclined with respect to a state vertical to the Z-axis by substantially identical angles. However inclined angles of screens 108, 109 may be different from each other. Alternatively both of or one of screens 108, 109 may be installed on structure body 301 in the state vertical to the Z-axis. Further, shapes and sizes of screens 108, 109 are also not limited to those described in the above-described exemplary embodiment.

Furthermore, in the above-described exemplary embodiment, the head-up display to be mounted on passenger vehicle 1 is exemplified. However the present disclosure is not limited to the on-vehicle application, and is applicable to other types of image display devices.

Moreover, the configurations of image display device 20 and irradiation generator 21 are not limited to those illustrated in FIG. 1C and FIG. 2, and can be modified as appropriate. In addition, the configuration of drive unit 300 for moving screens 108, 109 is not limited to one described in the exemplary embodiment, and can be modified as appropriate. For example, a configuration in which a drive unit of a piezoelectric type or an electrostatic type drives screens 108, 109 may be used.

The exemplary embodiment of the present disclosure is modifiable in various ways as appropriate within the scope of the technical idea disclosed in the claims.

What is claimed is:

1. An image display device comprising:
   a light source;
   a first screen on which an image is formed by being irradiated with light from the light source;
   a second screen on which an image is formed by being irradiated with the light from the light source;
   a scanning unit that scans the first screen and the second screen by using the light from the light source;
   an optical system that generates a virtual image by using light from the first screen and the second screen; and
   a drive unit that includes a holder for integrally supporting the first screen and the second screen and moves the first screen and the second screen together with the holder,
   wherein the first screen and the second screen are aligned perpendicular to a movement direction of the holder caused by the drive unit, and are installed at positions that are shifted from each other by a certain distance in the movement direction.

2. The image display device according to claim 1, wherein the holder includes a wall that closes a gap between an end of the first screen closer to the second screen and an end of the second screen closer to the first screen.

3. The image display device according to claim 1, further comprising
   an image processor that displays on the first screen a depth image whose sight distance changes along a depth direction and displays on the second screen a fixed image whose sight distance is constant by the second screen,
   wherein the first screen and the second screen are installed on the holder such that, when the first screen is positioned at an end of a movement range in which the first screen is moved to display the depth image, the second screen is positioned at a fixed position to display the fixed image.

4. The image display device according to claim 3, wherein the first screen and the second screen are installed on the holder such that, when the first screen is positioned at an end of the movement range to have a shortest sight distance, the second screen is positioned at the fixed position.

5. The image display device according to claim 1, further comprising:
   a first light shield member that covers at least part of a periphery of the first screen; and
   a second light shield member that covers at least part of a periphery of the second screen,
   wherein
   the holder includes a first protuberance and a second protuberance that respectively support a peripheral edge of the first screen and a peripheral edge of the second screen,
   the first light shield member is installed on the holder such that an inner peripheral edge of the first light shield member overlaps an upper surface of the peripheral edge of the first screen supported by the first protuberance through a heat resistant member, and
   the second light shield member is installed on the holder such that an inner peripheral edge of the second light shield member overlaps an upper surface of the peripheral edge of the second screen supported by the second protuberance through the heat resistant member.

6. The image display device according to claim 5, wherein the first screen and the second screen each have a rectangular contour, and
   the first protuberance and the second protuberance are respectively disposed along three sides of the rectangular contour of the first screen and three sides of the rectangular contour of the second screen.

7. The image display device according to claim 5, wherein the first protuberance and the second protuberance are integrally formed with the holder.

8. An image display device comprising:
   a light source;
   a screen on which an image is formed by being irradiated with light from the light source;
   an optical system that forms a virtual image by using the light from the screen;
   a drive unit that includes a holder for supporting the screen and moves the screen together with the holder; and
   a light shield member that covers a periphery of the screen,
   wherein
   the holder includes a protuberance that supports a peripheral edge of the screen, and
   the light shield member is installed on the holder such that an inner a peripheral edge of the light shield member on an inner periphery side overlaps an upper surface of the peripheral edge of the screen supported by the protuberance through a heat resistant member.

* * * * *